(12) United States Patent
Sato et al.

(10) Patent No.: US 7,438,320 B2
(45) Date of Patent: Oct. 21, 2008

(54) STEERING COLUMN FOR MOTOR VEHICLE

(75) Inventors: Kenji Sato, Kitagunma-Gun (JP); Naoki Sawada, Maebashi (JP); Tetsuya Koike, Takasaki (JP)

(73) Assignees: NSK Ltd., Shinagawa-Ku (JP); NSK Steering Systems Co., Ltd., Shinagawa-Ku (JP)

( * ) Notice: Subject to any disclaimer, the term of this patent is extended or adjusted under 35 U.S.C. 154(b) by 177 days.

(21) Appl. No.: 11/010,628

(22) Filed: Dec. 13, 2004

(65) Prior Publication Data
US 2005/0127656 A1    Jun. 16, 2005

(30) Foreign Application Priority Data

Dec. 16, 2003    (JP)    ............................... 2003-417891
Jan. 13, 2004    (JP)    ............................... 2004-004983

(51) Int. Cl.
*B62D 1/18*    (2006.01)

(52) U.S. Cl. ........................................ 280/775; 74/493
(58) Field of Classification Search ................. 280/775, 280/777, 779; 74/493, 492

See application file for complete search history.

(56) References Cited

U.S. PATENT DOCUMENTS

| 4,709,592 | A | * | 12/1987 | Andersson | .................... 74/493 |
| 5,088,766 | A | * | 2/1992 | Nakatsuka et al. | .......... 280/775 |
| 5,199,319 | A | * | 4/1993 | Fujiu | ............................ 74/493 |
| 5,711,189 | A | * | 1/1998 | Cartwright et al. | ............ 74/493 |
| 6,019,391 | A | * | 2/2000 | Stuedemann et al. | ........ 280/779 |
| 6,467,367 | B2 |  | 10/2002 | Kim et al. | ..................... 74/493 |
| 6,543,807 | B2 | * | 4/2003 | Fujiu et al. | .................. 280/775 |
| 2003/0217613 | A1 |  | 11/2003 | Sato et al. | ..................... 74/493 |
| 2004/0159173 | A1 |  | 8/2004 | Sawada | ...................... 74/492 |

FOREIGN PATENT DOCUMENTS

GB    2 281 375 A    3/1995
JP    02092779 A    *    4/1990

* cited by examiner

*Primary Examiner*—Ruth Ilan
(74) *Attorney, Agent, or Firm*—Sidley Austin LLP

(57) ABSTRACT

A steering column adjustable height and inclination of steering wheel has a singularity of control lever for controlling clamping/unclamping of a telescopic mechanism and a tilting mechanism for the adjustment. An energizing direction inverting mechanism inverts direction of biasing force applied to the lever by an energizing member from clamping direction to unclamping direction halfway through operation of the lever by a driver.

9 Claims, 16 Drawing Sheets a

STEERING COLUMN FOR MOTOR VEHICLE

This application is based on application No. 2003-417891 and No. 2004-004983 filed in Japan, the contents of which are hereby incorporated by reference.

FIELD OF THE INVENTION

The present invention relates to a steering column, and more particularly to a steering column for motor vehicle including at least any of a telescopic mechanism and a tilting mechanism.

BACKGROUND OF THE INVENTION

The telescopic mechanism and the tilting mechanism aim at adjusting back-and-forth position and tilt angle of a steering wheel to the easiest-to-manipulate position according to the driver's body form and taste.

The telescopic mechanism and the tilting mechanism are respectively provided with a column clamp which is clamped/unclamped for adjusting the steering wheel to back-and-forth position and a tilt head clamp which is also clamped/unclamped for adjusting tilt angle of the steering wheel. During these adjustments, the clamping condition of these column clamp and tilt head clamp is once cancelled and after back-and-forth position and tilt angle are adjusted under such condition, these are clamped again.

As a means for maintaining the clamping conditions of the column clamp and the tilt head clamp after back-and-forth position and tilt angle of the steering wheel are adjusted, each clamping device uses a spring. There has been disclosed in the British Patent No. 2 281 375 a steering column which enables adjustment of back-and-forth position and tilt angle of the steering wheel using a single control lever which can be manipulated without removing a hand from the steering wheel.

In the steering column disclosed in the British Patent, the control lever is always retreated to a retreat position away from the steering wheel because it is pulled with force of a tensile spring in view of preventing an accident that the driver's hand is in contact with the control lever during the driving. On the occasion of adjusting the steering wheel, if the control level is pulled with a hand toward the steering wheel, the control level is pulled toward the steering wheel against the tensile spring. Movement of this control lever is transmitted to the column clamp for back-and-forth position adjustment provided away from the control lever via a cable movable in a flexible tube. Accordingly, the column clamp is unclamped.

Moreover, with movement of this control lever, the tilt head clamp for adjusting tilt angle provided in the periphery of this control lever operates toward unclamping side against a compression spring and a plate spring. When the steering wheel is manipulated with both hands, back-and-forth position and tilt angle of the steering wheel are adjusted, and the control lever is freed from fingers under the condition that the control lever is maintained with the fingers, the control lever is returned to the retreat position with forces of the tensile spring and compression spring and the column clamp and tilt head clamp are clamped.

In the steering column, adjustment of the steering wheel must be conducted while the control lever is continuously left in the unclamping condition. Since a spring force increases with increase in displacement thereof, the maximum force is required at the end position of the unclamping side where the spring is displaced to the most extent. Therefore, manipulation ability becomes worse because the steering wheel must be adjusted while a large force for maintaining the unclamping condition is continuously applied to the control level.

Moreover, if a longer control lever is used to increase a lever ratio in order to reduce the force for operating the control lever, manipulations of switches provided in the periphery of steering wheel are impeded and in addition the longer control lever interferes with an instrument panel at the time of secondary collision. Accordingly, here rises a demerit that the space for allocating the control lever is restricted.

SUMMARY OF THE INVENTION

The present invention relates to a steering column provided with a telescopic mechanism and/or a tilting mechanism which can realize, with both hands, adjustment of back-and-forth position and/or tilt angle of the steering wheel by setting the telescopic mechanism and/or tilting mechanism to the unclamping condition with manipulation of the control lever and thereafter maintaining such unclamping condition even after the control lever is freed from the fingers. Moreover, the present invention can provide a steering column for operation capability of the control lever by gradually reducing the force required to manipulate the control lever as the control lever comes close to the end part of the unclamping side.

According to a profile of the present invention, the steering column of the present invention comprises a telescopic mechanism for adjusting back-and-forth position of the steering wheel, a tilting mechanism for adjusting tilt angle of the steering wheel, a clamping/unclamping mechanism for clamping/unclamping the telescopic mechanism, a clamping/unclamping mechanism for clamping/unclamping the tilting mechanism, a single control lever for clamping/unclamping both clamping/unclamping mechanisms to the, a first energizing member for energizing the control lever, an energizing direction inverting mechanism for inverting the direction in which the first energizing member energizes the control lever, a control lever maintaining mechanism for maintaining the control lever in at least any of the clamping side control lever end or the unclamping side control lever end. In this steering column of the present invention, the energizing direction inverting mechanism inverts the direction in which the first energizing member energizes the control lever and the control lever maintaining mechanism maintains the control lever at the manipulation end of the unclamping side.

Since the unclamping condition is maintained as described above, a driver can easily adjust back-and-forth position and/or tilt angle of the steering wheel.

According to another profile of the present invention, the steering column of the present invention comprises a telescopic mechanism for adjusting back-and-forth position of the steering wheel, a tilting mechanism for adjusting tilt angle of the steering wheel, a clamping/unclamping mechanism for clamping/unclamping the telescopic mechanism, a clamping/unclamping mechanism for clamping/unclamping the tilting mechanism, a single control lever for clamping/unclamping both clamping/unclamping mechanisms, and an energizing member for energizing the control lever to the side for clamping the clamping/unclamping mechanism, wherein as the control lever is operated toward the unclamping side control lever end from the clamping side control lever end, an energizing force of the energizing member working for the control lever can be reduced.

Accordingly, only a small force is required for operating the control lever in the unclamping direction resulting in the effect that manipulation ability of the control lever can be improved. Moreover, only a small force is required for manipulation of the control lever, the control lever can be formed in compact size, manipulations of the switches in the periphery of the steering wheel are not impeded, and limitation on the space for allocating the control lever can be eliminated.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of various embodiments of the invention, and therefore reference is made to the claims which follow the description for determining the scope of the invention.

BRIEF DESCRIPTION OF THE DRAWINGS

FIG. 12(1) is an operation explanation diagram illustrating an energizing direction inverting mechanism 8 and a control lever maintaining mechanism 89 of the present invention to show the condition that the control lever 7 is located at the clamping side control lever end a.

FIG. 12(2) is an operation explanation diagram illustrating the energizing direction inverting mechanism 8 and the control lever maintaining mechanism 89 of the present invention to show the condition that an engaging pin 471, a center axis 81, and the center of the engaging pin 821 are aligned on the line in the course of the operation to attract the control lever 7.

FIG. 12(3) is an operation explanation diagram illustrating the energizing direction inverting mechanism 8 and the control lever maintaining mechanism 89 of the present invention to show the condition that the control lever 7 is allocated at the unclamping side control lever end b.

FIG. 14(1) is a front elevation diagram of the steering column 1 of a third embodiment of the present invention to show the condition that the control lever is located at the clamping side control lever end a.

FIG. 14(2) is a right side elevation diagram of the steering column 1 of the third embodiment of the present invention.

FIG. 16(1) is a front elevation diagram of the steering column of the third embodiment of the present invention to show the condition that the control lever is located at the clamping side control lever end a.

FIG. 16(2) is a right side elevation diagram of the steering column 1 of the third embodiment of the present invention.

DETAILED DESCRIPTION OF THE INVENTION

First Embodiment

The present invention will be described with reference to the accompanying drawings. FIG. 1 to FIG. 12 illustrate a steering column of the first embodiment of the present invention. According to this steering column, the clamping/unclamping mechanisms of both telescopic mechanism and tilting mechanism can be manipulated simultaneously in one direction of a single control lever. Moreover, when a driver takes a hand off the control lever, the unclamping condition of both telescopic mechanism and tilting mechanism can be maintained.

Figure 1:
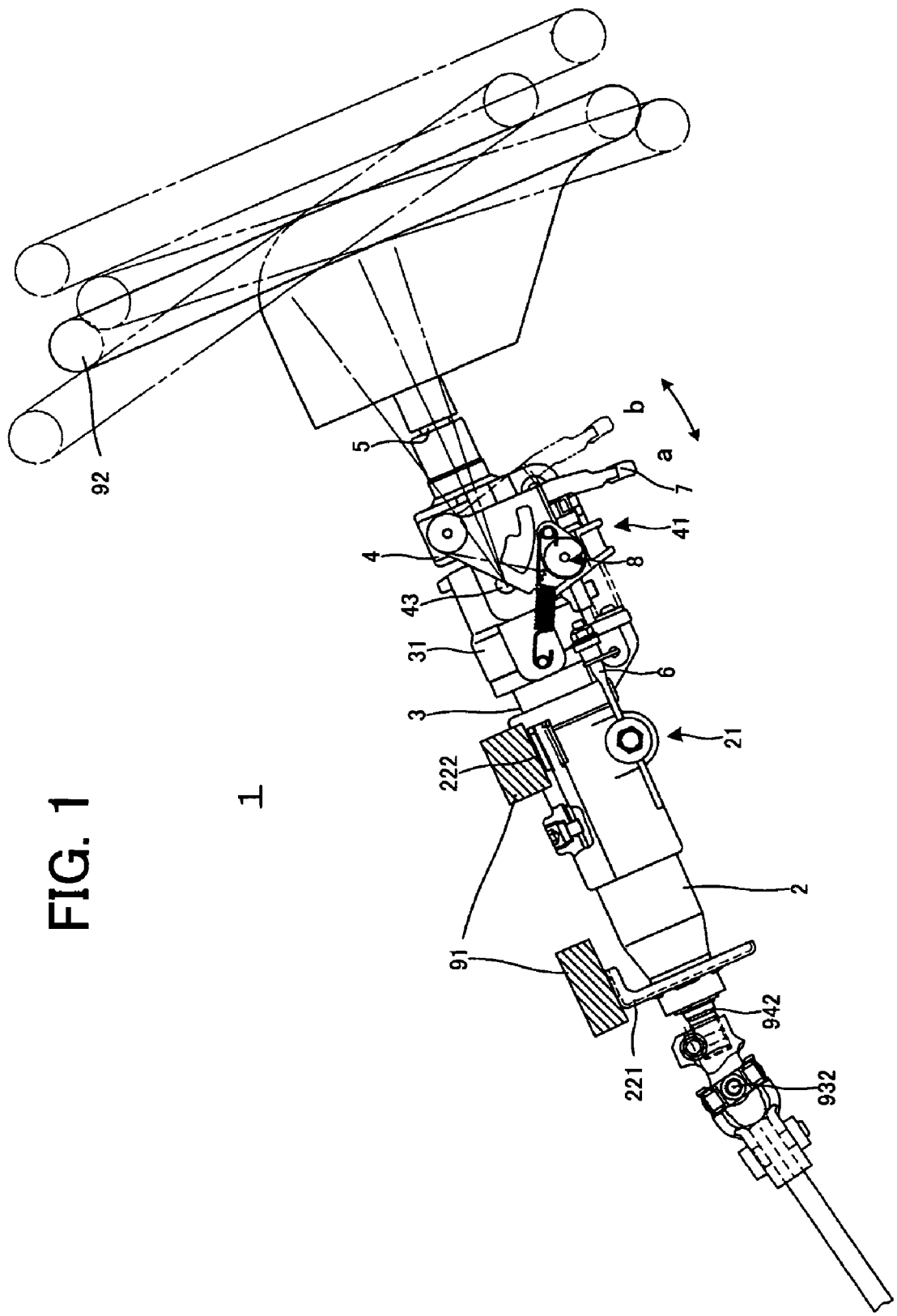
FIG. 1 is an outside view of a steering column 1 of the present invention.

General Outline:

FIG. 1 is an outside view of the steering column 1 of the present invention. The steering column 1 comprises a fixed column member 2, a moving column member 3, a column head 31, a tilt head 4, a wheel shaft 5, a column clamp 21, a tilt head clamp 41, and a control lever 7.

The fixed column member 2 is provided with mounting sections 221, 222 for mounting to a vehicle body 91. The fixed column member 2 supports the moving column member 3 unrotatably around the center axis but movable in the direction of the center axis. The moving column member 3 is also provided with the column head 31 at the right end side thereof. This column head 31 supports the tilt head 4 which is tilted around the center axis 43. This tilt head 4 rotatably supports the wheel shaft 5, allowing the steering wheel 92 to be fixed at the right end part thereof.

The column head 31 is provided with the column clamp shaft 6 which is rotatable around the axis parallel to the center axis of the moving column member 3. The fixed column member 2 is also provided with the column clamp 21, which can relatively move against the column clamp shaft 6. With rotation of the column clamp shaft 6, the moving column member 3 can be set to the clamping/unclamping conditions for the fixed column member 2.

Moreover, the column head 31 is provided with the tilt head clamp 41 for clamping/unclamping the tilt head 4 for the column head 31. The tilt head 4 supports a single control lever 7. This control lever 7 is allocated at the position away from the steering wheel 92. Accordingly, when the steering wheel 92 is operated during the driving, the driver's hand is freed from contact with the control lever 7 so that the moving column member 3 or the tilt head 4 is never unclamped. In addition, manipulations of switches provided in the periphery of the steering wheel 92 are never impeded.

When the control lever 7 is rocked in the direction approaching to the steering wheel 92, a driven lever 714 (FIG. 4) rocks following the control lever 7 to rotate a column clamp shaft 6. This rotation is transferred to the column clamp 21, unclamping the moving column member 3. Moreover, with the operation for rocking the control lever 7 in the direction approaching to the steering wheel 92, the tilt head 4 is unclamped simultaneously.

The left end of the wheel shaft 5 is connected, within the steering column 1, to a universal joint 931 and is also connected to a mechanism for operating the direction of front wheels through a pair of an upper intermediate shaft 941 and a lower intermediate shaft 942 (shown in FIG. 2) which are splined and a lower universal joint 932.

Figure 2:
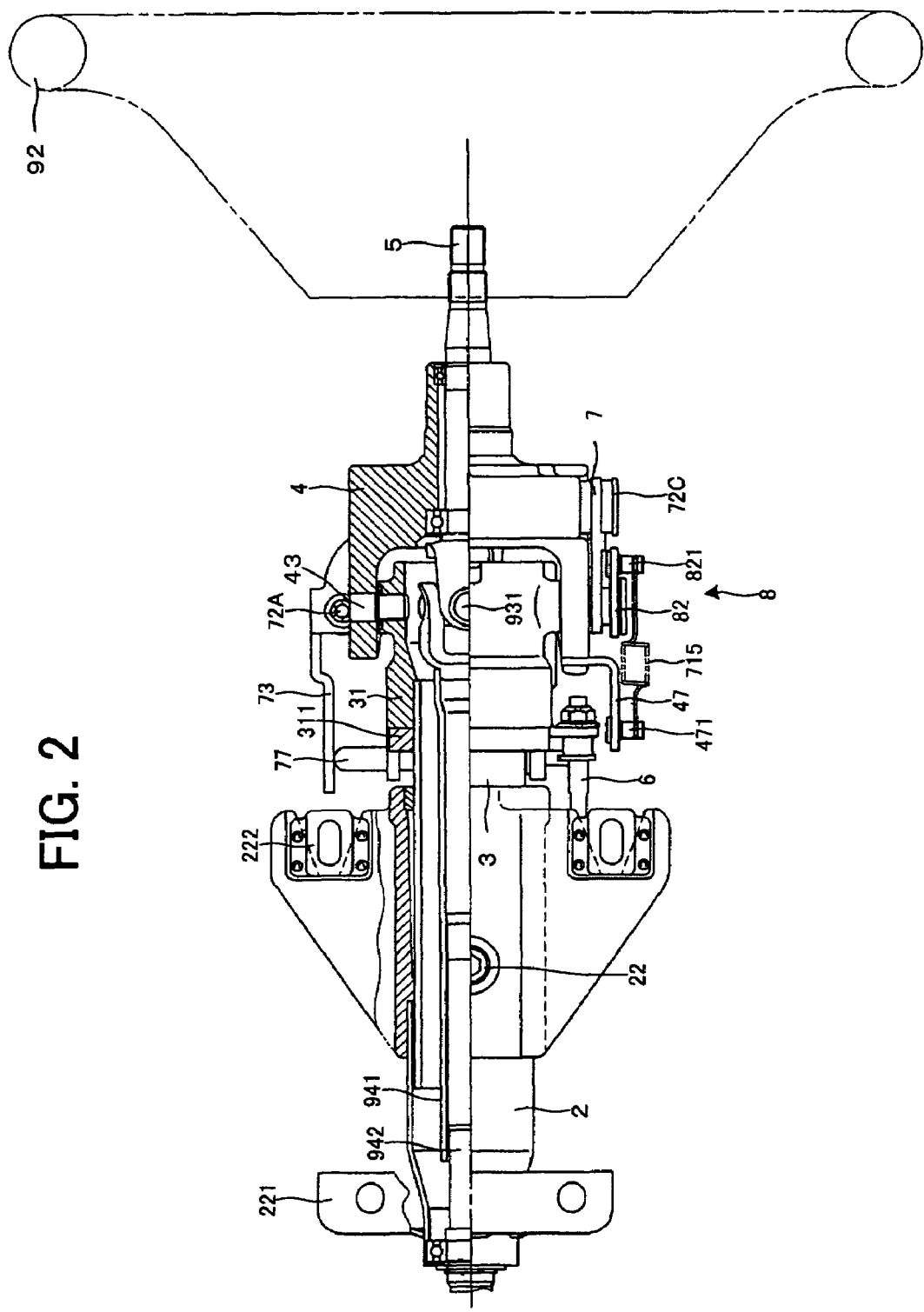
FIG. 2 is a top view including a partial cross-sectional view when the steering column 1 is observed from the direction P in FIG. 3.
Figure 3:
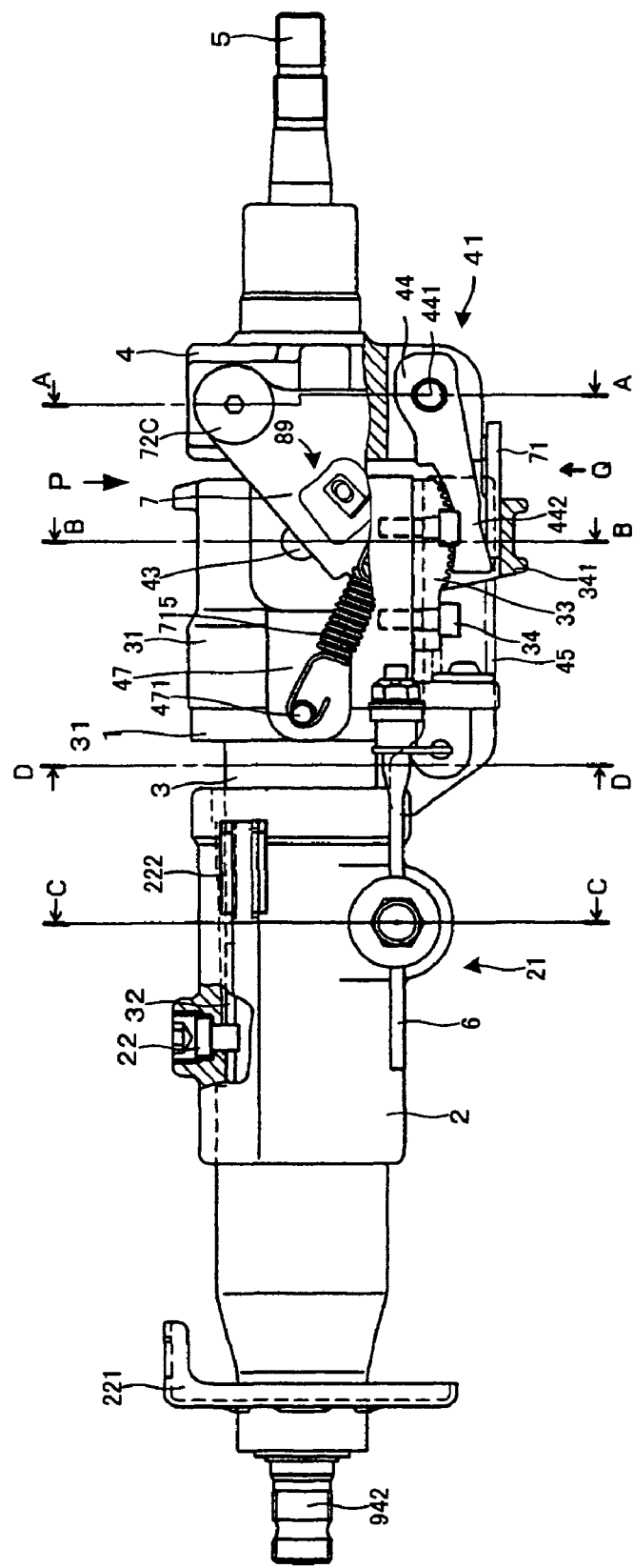
FIG. 3 is an enlarged view of the essential portion of FIG. 1, wherein the steering column 1 is partially cut away.
Figure 4:
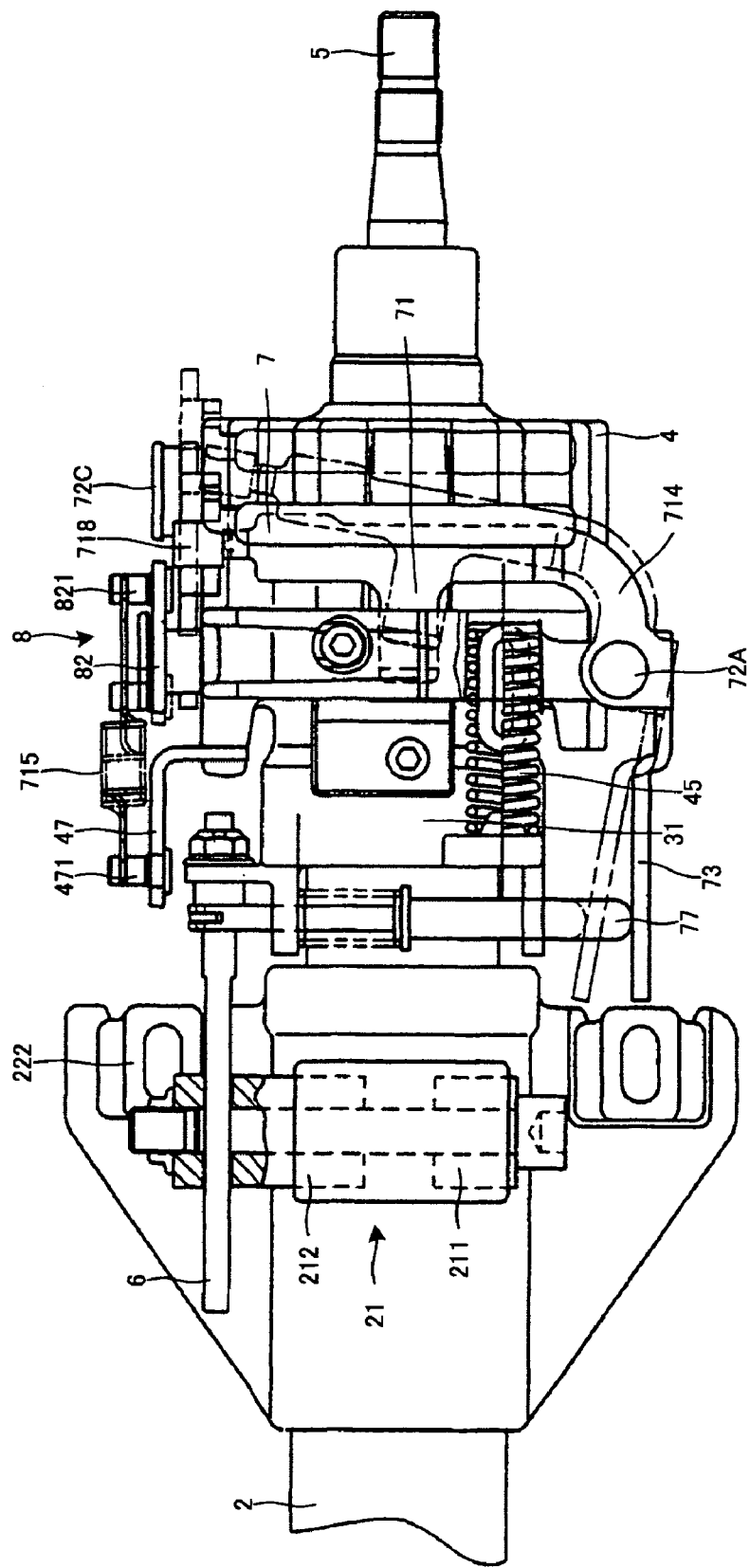
FIG. 4 is a bottom view when the steering column 1 is observed in the direction Q of FIG. 3.
Figure 5:
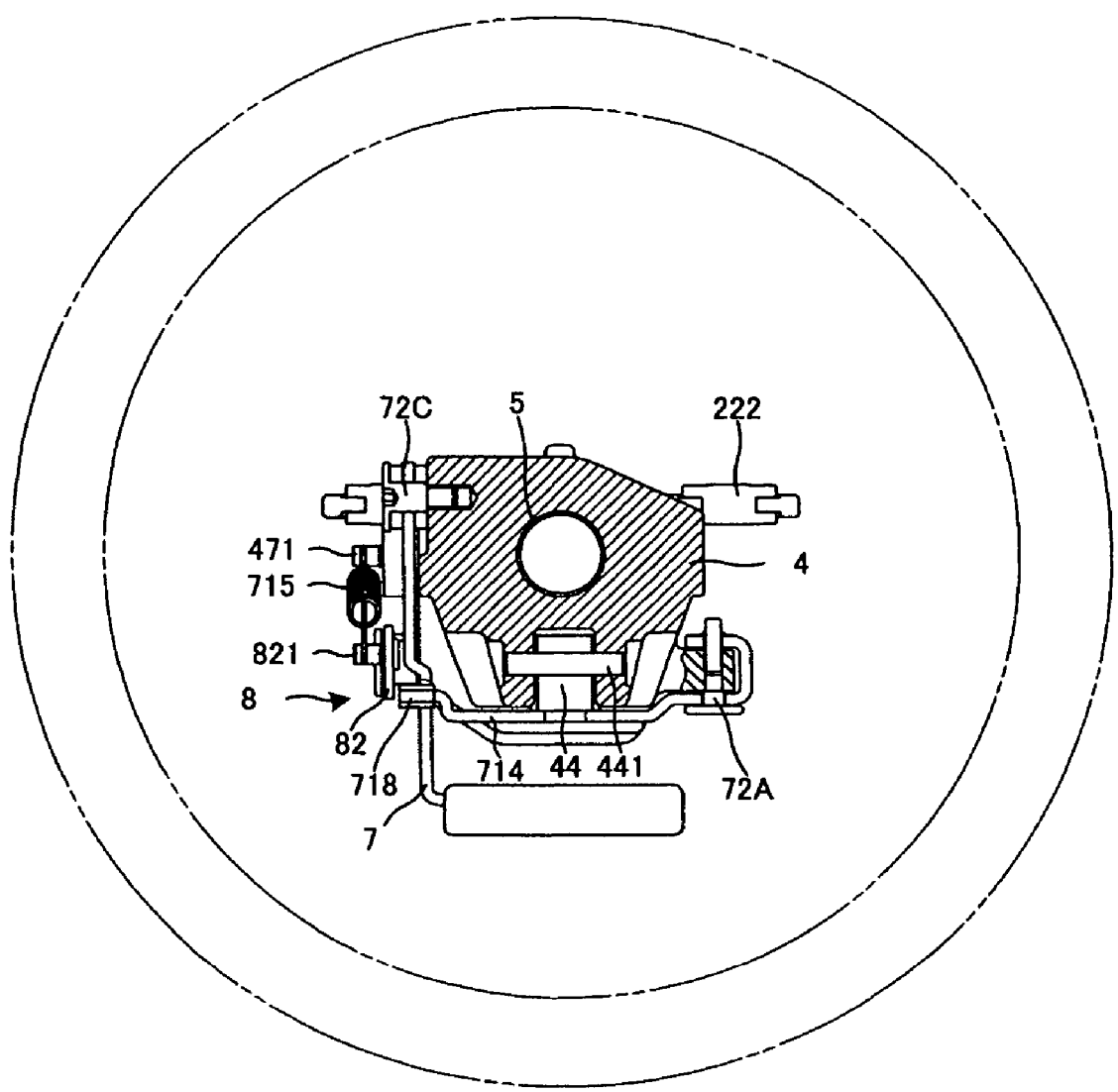
FIG. 5 is a cross-sectional view along the line A-A in FIG. 3.
Figure 6:
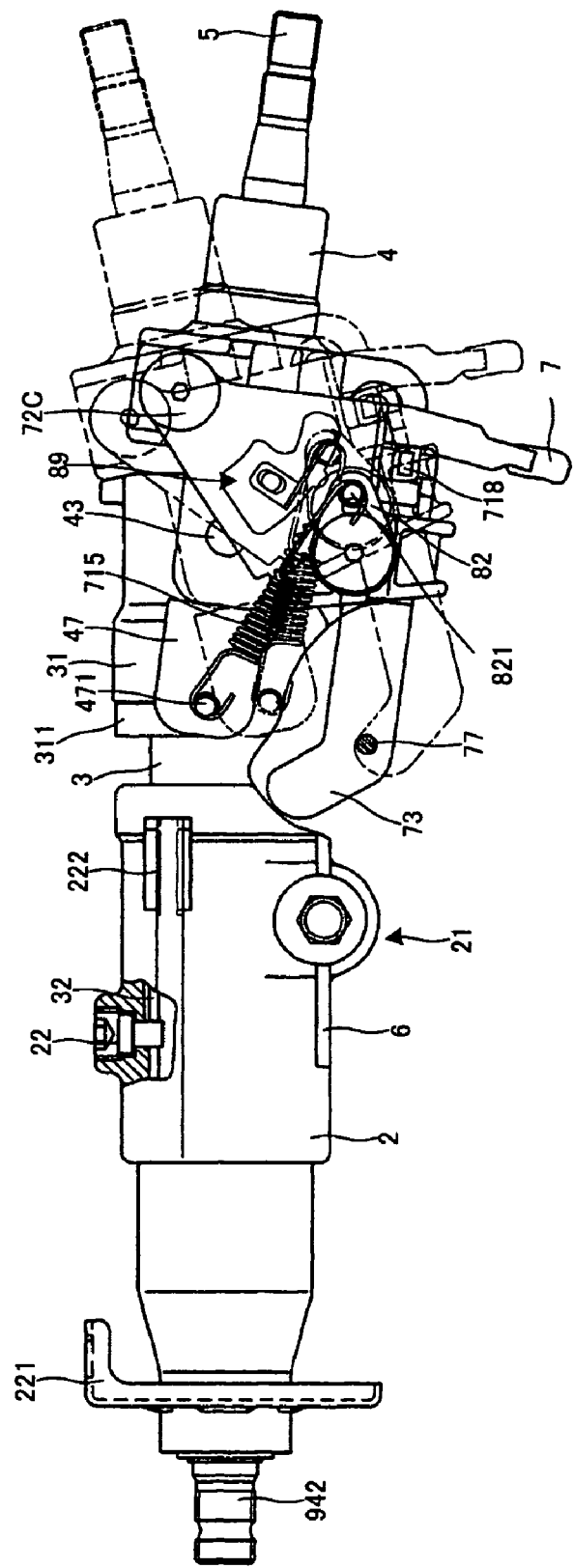
FIG. 6 is a side view of FIG. 1 which is partially cut away to indicate adjustment of tilt position of the steering column 1.
Figure 7:
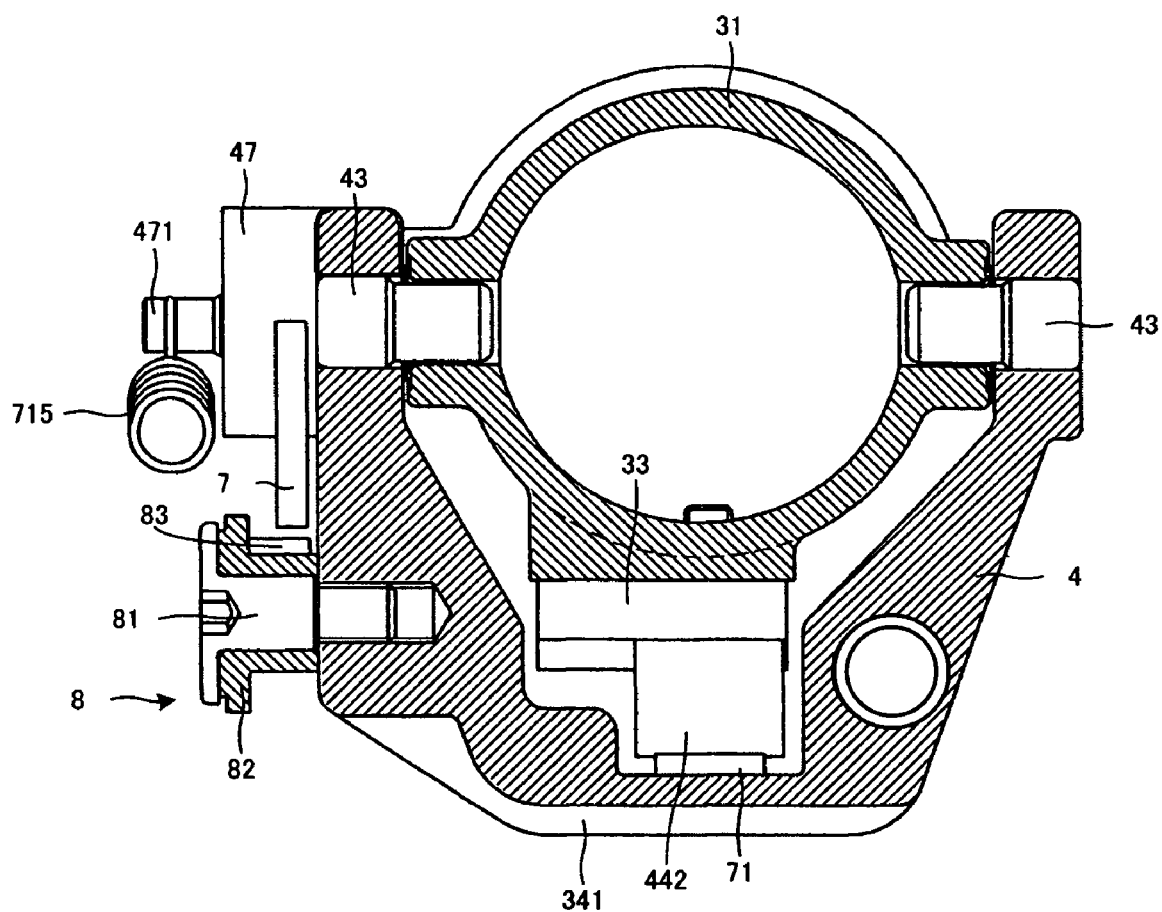
FIG. 7 is a cross-sectional view along the line B-B in FIG. 3.

Tilt Head Clamp:

FIG. 2 is a partly cutaway top view of the steering column observed from the upper direction (P) in FIG. 3. FIG. 3 is an enlarged partly cutaway view of the essential portion of the steering column 1 of FIG. 1. FIG. 4 is a bottom view of the steering column 1 observed from the lower direction (Q) of FIG. 3. FIG. 6 is an enlarged partly cutaway view of the steering column 1, illustrating the condition for adjusting the tilt angle of steering wheel. Here, a solid line in FIG. 1 and FIG. 4 indicates the condition before the control lever 7 is pulled, while a chain line indicates the condition that the control lever 7 is pulled toward the steering wheel 92. FIG. 5 and FIG. 7 are respectively cross-sectional views along the lines A-A and B-B in FIG. 3.

The tilt head clamp 41 is constituted as described below. That is, the column head 31 is fitted with a segment gear 33 having the center at a tilt center shaft 43 using a bolt 34. Leaving a space against the segment gear 33, the tilt head 4 is provided with a back contact member 341. Meanwhile, a left gear portion 442 of a gear arm 44 supported rotatably on the center of shaft 44 with the tilt head 4 and a projecting portion 71 are provided within the space. The lever center axis 72A (FIG. 4, FIG. 5) is fitted to the tilt head 4 and a driven lever 714 (FIG. 4, FIG. 5) rocking around the center of the lever center axis 73A is integrally formed with the projecting portion 71.

In FIG. 3, when the projecting portion 71 is pushed in the left direction, the projecting portion 71 also pushes the gear portion 442 from the rear surface thereof. Accordingly, the gear portion 442 is pushed toward the segment gear 33 so that the teeth of both gears may be engaged with each other. When the gear portion 442 pushes the segment gear 33, the back contact member 341 receives a reaction force applied to the projecting portion 71. Therefore, the tilt head 4 is fixed to the column head 31. The tilt head 4 is locked at a stepped position in an angular location where the gear portion 442 engages with the segment gear 33. When the projecting portion 71 moves toward the right in FIG. 2, the gear arm 44 rotates counterclockwise in FIG. 3 around the center of shaft 441 with the gravity of the gear arm 44. Accordingly, the teeth of these gears are disengaged and the tilt head clamp 41 is unclamped.

Universal Joint and Intermediate Shaft:

As illustrated in FIG. 2, an upper universal joint 931 is constituted between the right end of the upper intermediate shaft 941 and the left end of the wheel shaft 5. Since the center of the universal joint 931 is laid on the shaft line of the tilt center shaft 43, if the tilt head 4 is tilted, the universal joint is freed from influence of such tilt.

A lower intermediate shaft 942 is supported rotatably with the fixed column member 2 and the lower intermediate shaft 942 and the upper intermediate shaft 941 are splined. Therefore, the moving column member 3 can be moved in the right and left directions in FIG. 2. Without relationship of the moving position of the moving column member 3, rotation of the upper intermediate shaft 941 can be transferred to the lower intermediate shaft 942 because of the spline-coupling of the lower intermediate shaft 942 and the upper intermediate shaft 941. Moreover, rotation of the steering wheel 92 can also be transferred to the lower intermediate shaft 942 even by adjusting the back-and-forth position of the steering wheel 92.

Fixed Column Member and Moving Column Member:

As illustrated in FIG. 3, a long hole 32 is formed along the shaft direction within a cylindrical portion of the moving column member 3 and this long hole 32 is engaged with a stopper member 22 provided to the fixed column member 2. Since the moving column member 3 is prevented in release from and rotation against the fixed column member 2 with the long hole 32 and stopper member 22, it can move in the shaft direction within the range defined by the long hole 32 within the fixed column member 2. A cushioning stopper 311 provided at the left end surface of the column head 31 is the cushioning material formed of rubber, synthetic resin or the like provided to prevent impactive collision between metal components when the column head 31 collides, during the adjustment, with the right end surface of the fixed column member 2.

Figure 8:
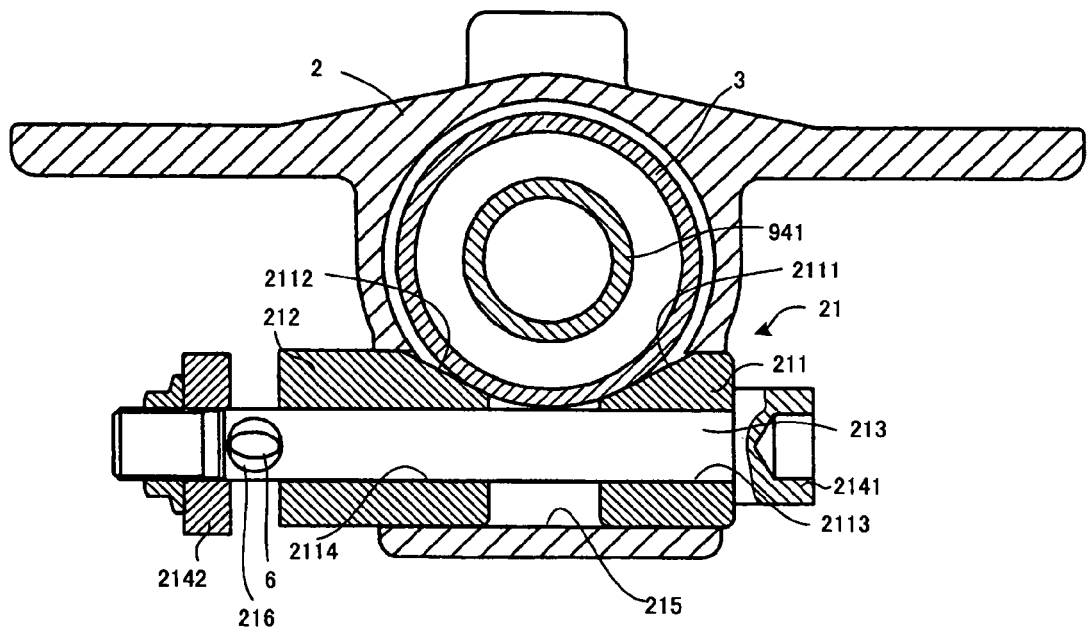
FIG. 8 is a cross-sectional view along the line C-C in FIG. 3.
Figure 9:
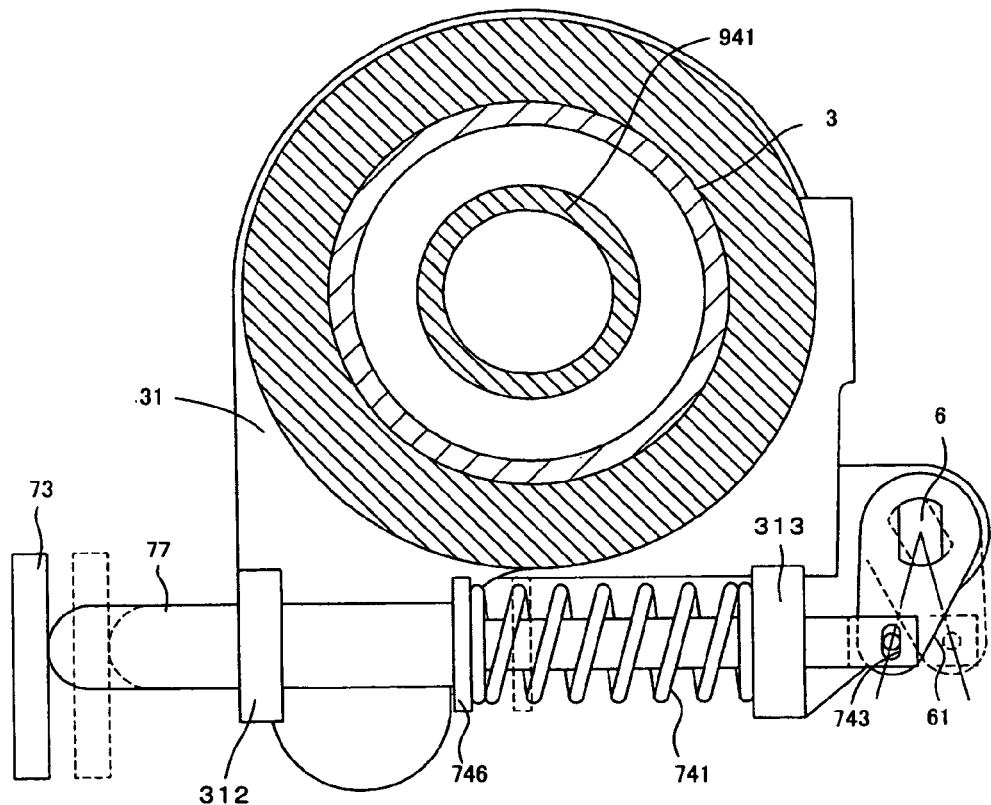
FIG. 9 is a cross-sectional view along the line D-D in FIG. 3.
Figure 10:
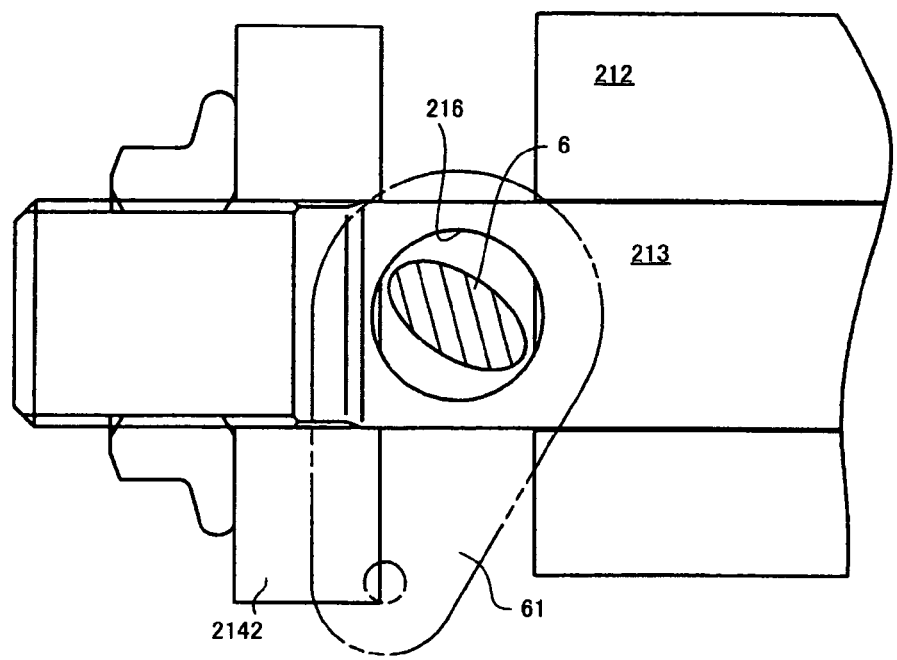
FIG. 10 a partially enlarged view of FIG. 8 indicating the rotating position of a column shaft 6 in the unclamping condition.
Figure 11:
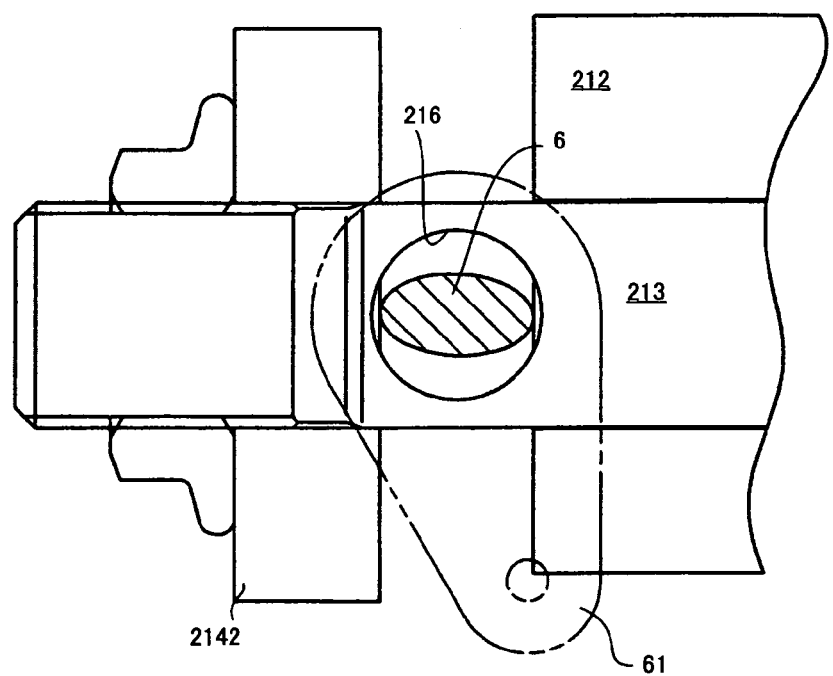
FIG. 11 is a partially enlarged view of FIG. 8 indicating the rotating position of the column shaft 6 in the clamping condition.

Column Clamp:

A structure of the column clamp 21 will be described with reference to FIG. 8, FIG. 9, FIG. 10 and FIG. 11. FIG. 8 is a cross-sectional view along the line C-C in FIG. 3. FIG. 9 is a cross-sectional view along the line D-D in FIG. 3. FIG. 10 and FIG. 11 are partly enlarged diagrams of FIG. 8, illustrating the relationship between the rotating position and the clamping/unclamping conditions of the column clamp shaft 6. The column clamp 21 is provided to the fixed column member 2 and includes a first wedge 211, a second wedge 212, a clamp bar 213, and reaction members 2141, 2142.

The fixed column member 2 is provided with a wedge hole 215 in the horizontal direction and a part of the wedge hole 215 is opened to a cavity of the fixed column member 2. The first wedge 211 and second wedge 212 respectively have the sloping surfaces 2111, 2112 and these wedges are accommodated within the wedge hole 215 in the manner that the sloping surfaces 2111 and 2112 are opposed with each other. The sloping surfaces 2111, 2112 of two wedges are provided facing to the external circumference of the cylindrical portion of the moving column member 3.

The first wedge 211 and second wedge 212 are respectively provided with clamp bar holes 2113, 2114 and a clamp bar 213 is provided through this clamp bar hole. At both ends of the clamp bar 213, reaction members 2141, 2142 which are larger than the clamp bar holes 2113, 2114 in the external diameter are fixed. The clamp bar 213 is provided with a column clamp shaft hole 216 which is in contact with one reaction member 2142 and a non-circular shape cross-sectional portion which is substantially elliptical in shape of the column clamp shaft 6 is inserted into this column clamp shaft hole 216.

At one end of the column clamp shaft 6, a rocking arm 61 is secured. The non-circular shape cross-sectional portion of the column clamp shaft 6 is inclined, in the unclamping condition, to a large extent in the elliptical longer diameter direction as illustrated in FIG. 10, while the longer diameter direction is directed, in the clamping condition, in the direction near to the shaft direction of the clamp bard 213 as illustrated in FIG. 11. When the rocking arm 61 is turned to rock from the condition of FIG. 10 with the structure described above, the column clamp shaft 6 rotates resulting in the condition of FIG. 11. In this case, when the reaction member 2142 is pressed toward the left with one of the elliptical longer diameter portions, the clamp bard 213 is pulled toward the left and the reaction member 2141 pushes the first wedge 211 toward the left. Meanwhile, the second wedge 212 is pressed toward the right with the other of the elliptical longer diameter portions.

As a result, two wedges are mutually coming closer, respective sloping surfaces 2111, 2112 press the external circumference of the cylindrical portion of the moving column member 3 and the moving column member 3 is clamped for the fixed column member 2. Since the first wedge 211 and the second wedge 212 can move integrally a little in the right and left directions, the unbalanced condition in which only one wedge intensively presses the moving column member 3 is never generated.

When the rocking arm 61 is turned to rock in an opposite direction, the first wedge 211 and the second wedge 212 move to separate with each other with the movement inverted from that described above, canceling the clamping condition of the moving column member 3.

Operations of Control Lever:

Next, movement of control lever 7 and members interlocking with such movement will be described. As illustrated in FIG. 4, FIG. 5 and FIG. 6, the control lever 7 is provided for locking at the left side surface of the tilt head 4. Moreover, at the lower surface of the tilt head 4, a driven lever 714 which is driven to rock with operations of the control lever 7, a pusher plate 73 integrally extending to the left from the driven lever 714, and a projecting portion 71 integrally formed to the driven lever 714 can be seen. The driven lever 714 and pusher plate 73 are respectively formed in the shape of inverse alphabet L as a whole.

Moreover, at the side surface of the tilt head 4, the energizing direction inverting mechanism 8 and control lever maintaining mechanism 89 can be seen. FIG. 4 illustrates a couple of conditions using a solid line and a chain line. In one condition, the control lever 7 is operated (namely, the control lever end is pulled toward the steering wheel 92) to adjust the entire part, back-and-forth position and tilt angle of the control lever 7. In the other condition, the operation end part is returned in the direction where the control lever 7 is located away from the steering wheel 92. FIG. 1 also illustrates a couple of conditions with a chain line and a solid line. In one condition, the control lever 7 is operated (called the unclamping side control lever end b). In the other condition, the control end part is returned in the direction where the control lever 7 is located away from the steering wheel 92 (called the clamping side control lever end a).

The control lever 7 is pivoted to rock with the lever center axis 72C threaded into the side surface of the tilt head 4. Moreover, the energizing direction inverting mechanism 8 is loaded to the center shaft 81 (FIG. 7) which is threaded into the side surface of the tilt head 4. The energizing direction inverting mechanism 8 is constituted with a rocking lever 82, an engaging pin 821, a pinion 83, and a segment gear 84. The rocking lever 82 is pivoted to rock with the center shaft 81 and the pinion 83 is formed to a boss portion of the rocking lever 82. This pinion 83 engages with the segment gear 84 (FIG. 12(1) to FIG. 12(3)) formed to the control lever 7.

Moreover, a spring 715 is extended between the engaging pin 821 fitted to the rocking lever 82 and an engaging pin 471 fitted to a bracket 47 formed at the left end part of the tilt head 4. This spring 715 always energizes clockwise the control lever 7 through the rocking lever 82, pinion 83, and segment gear 84.

Figure 12:
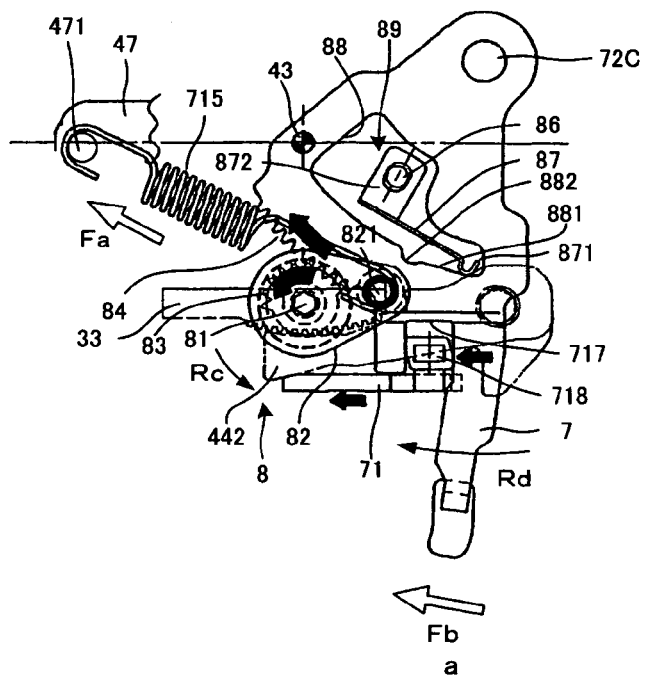
Figure 12:
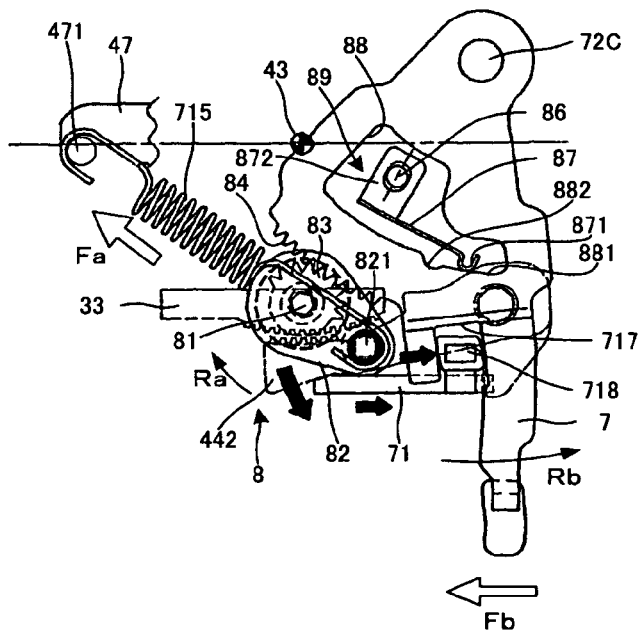
Figure 12:
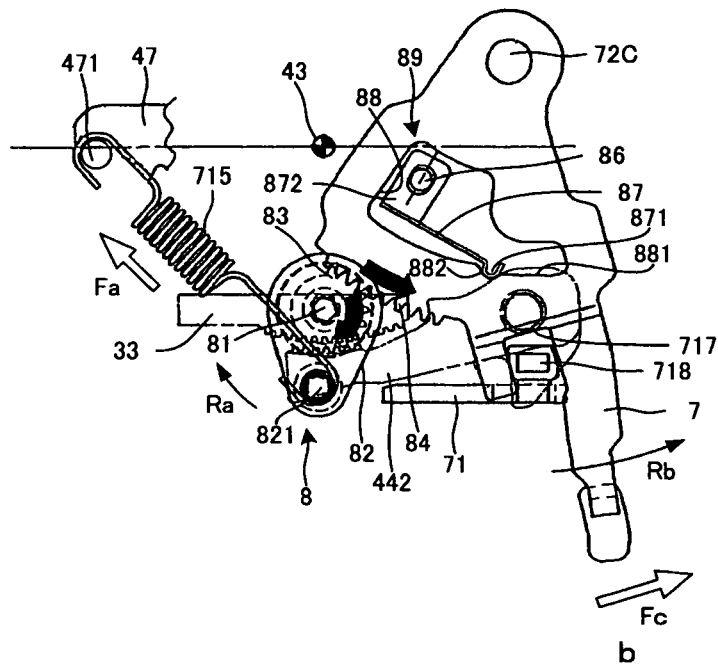

On the control lever 7, a fork-type engaging depression 717 (FIG. 12(1) to FIG. 12(3)) is formed. An engaging projection 718 at the end part of the driven lever 714 is inserted into the engaging depression 717. Therefore, the driven lever 714 follows up the operations of the control lever 7 to rock around the center of the lever center axis 72A.

In the condition before the control lever 7 is pulled indicated by a solid line in FIG. 4 (clamping side control lever end a), since the control lever 7 is located at the rocking end part in the clockwise direction with a spring force of the spring 715, the projection 71 of driven lever 714 is pushed to the left to clamp the tilt head 4. When the control lever 7 is pulled toward the steering wheel 92 during adjustment of the tilting mechanism position and telescopic mechanism position, the driven lever 714 is rocked clockwise around the center of the lever center axis 72A. Accordingly, when the control lever 7 turns to rock to the position indicated by a chain line in FIG. 4 (unclamping side control lever end b), the projection 71 integrated with the driven lever 714 moves to the right to unclamp the tilt head clamp 41.

When the control lever 7 moves to the position indicated with a chain line (unclamping side control lever end b) from the position indicated with a solid line (clamping side control lever end a) in FIG. 4, the pusher plate 73 integrated with the driven lever 714 pushes a pusher rod 77 and the column clamp 21 described above is unclamped. Accordingly, the pulling operation of the single control lever 7 simultaneously realizes the unclamping operation of the tilt head clamp 41 and the unclamping operation of the column clamp 21.

The pusher rod 77 (FIG. 9) is supported to slide with a rib 312 in the left side of the column head 31 and with a rib 313 in the right side thereof in the direction parallel to the tilt center shaft 43. The pusher rod 77 is inserted into a spring 741 to energize a collar 746 in the left direction of FIG. 9 and the right end thereof is provided with a small long hole 743 in the right angle direction. The right end of the pusher rod 77 axially engages with one end of the rocking arm 6 through this long hole 743. The long hole 743 is provided to absorb amount of displacement in the relative position to the rocking arm 61 when the pusher rod 77 moves in the shaft direction.

The spring 741 energizes the pusher rod 77 in the left direction (FIG. 9). The rocking arm 61 axially engaging at the end part of left side is energized to rotate clockwise. The spring force imparted to the rocking arm 61 maintains the column clamp shaft 6 to the clamping position (FIG. 11, it should be noted that the right and left are inverted because direction is opposite in FIG. 11 and FIG. 9). Position of the rocking arm 61 in this case is indicated with a solid line.

Energizing Direction Inverting Mechanism:

A structure and operations of the energizing direction inverting mechanism 8 will be described with reference to FIG. 12(1) to FIG. 12(3). FIG. 12(1) is an operation explanation diagram showing the condition that the control lever 7 is located at the control lever end a in the clamping side (condition before the control lever 7 is pulled) indicated with a solid line in FIG. 4. FIG. 12(2) is an operation explanation diagram showing the condition that the center of the engaging pin 471, center shaft 81, and engaging pin 821 are aligned on a line in the course of the operation to pull to control lever 7 toward the steering wheel 92. FIG. 12(3) is an operation explanation diagram showing the condition that the control lever 7 is located at the control lever end b in the unclamping side (condition after the control lever 7 is pulled) indicated with a chain line in FIG. 1 and FIG. 4.

In FIG. 12(1), since the clamping side control lever end a pushes counterclockwise (direction of the arrow mark Rc) the rocking lever 82 toward the rocking end around the center of the center axis 81 via the engaging pin 821 with a spring force Fa of the spring 15 and also pushes clockwise the segment gear 84 engaged with the pinion 83, a spring force (Fb indicated by the white arrow mark) the control lever 7 is applied to the control lever 7 and therefore the control lever 7 is energized clockwise (direction of the arrow mark Rd) toward the rocking end.

In this case, the projection 71 of the driven lever 714 is pushed toward the left, setting the tilt head clamp 41 to the clamping condition. Moreover, the pusher plate 73 integrated with the driven lever 714 is located at the position indicated with a solid line in FIG. 4 and therefore the column clamp 21 is also in the clamping condition.

When the control lever 7 is pulled toward the steering wheel 92, the control lever 7 turns counterclockwise (direction of arrow mark Rb) to rock around the center of the lever center axis 72C as illustrated in FIG. 12(2) and the segment gear 84 rotates clockwise (direction of arrow mark Ra) the pinion 83. Accordingly, the rocking lever 82 integrated with the pinion 83 also turns clockwise (direction of arrow mark Ra) to rock. Here, in FIG. 12(1) to FIG. 12(3), the arrow marks Ra and Rc indicate the rocking direction of the rocking lever 82, while the arrow marks Rb, Rd indicate the rocking direction of the control lever 7. Moreover, the white arrow marks Fa, Fb, Fc indicate the energizing direction of the spring 715 working for the rocking lever 82 and control lever 7.

When the rocking lever 82 turns clockwise (direction of arrow mark Ra) to rock, the center of the engaging pin 821 comes close to the line connecting the engaging pin 471 and the center axis 81. Accordingly, the length of the perpendicular line drooped from the center of the center axis 81 to the vector of the energizing force (white arrow mark Fa) of the spring 715 working for the engaging pin 821 comes close to zero. Therefore, a moment of the force working for the engaging pin 821 by the spring 715 to turn counterclockwise the rocking lever 82 to rock also gradually comes close to zero.

Accordingly, a clockwise force (white arrow mark Fb) of the spring 715 working for the control lever 7 gradually comes close to zero as it comes close to the position where the centers of the engaging pin 471, center axis 81 and engaging pin 821 are aligned on a line. As a result, an operation force required to attract the control lever 7 toward the steering wheel 92 against the force of the spring 715 gradually comes close to zero. In this timing, the driven lever 714 driven by the control lever 7 turns clockwise to rock around the center of the lever center axis 72A and the projection 71 integrated with the driven lever 714 moves to the right, accelerating the unclamping operation of the tilt head clamp 41.

Simultaneously, since the pusher plate 73 integrated with the driven lever 714 pushes the pusher rod 77 against the force of the spring 741, the unclamping operation of the column clamp 21 described above is further continued. Therefore, a force to push the pusher rod 77 against the force of the spring 741 is gradually added as the force required to attract the control lever 7 toward the steering wheel 92.

When the control lever 7 is further attracted toward the steering wheel 92, the centers of the engaging pin 471, center axis 81, engaging pin 821 are aligned on a line as illustrated in FIG. 12(2), and a moment of the force of the spring 715 to turn counterclockwise the rocking lever 82 to rock is reduced to zero. When the control lever 7 is further attracted toward the steering wheel 92, the engaging pin 821 is apart from the line connecting the centers of the engaging pin 471 and the center axis 81 and turns clockwise (direction of arrow mark Ra) to rock.

In this timing, as illustrated in FIG. 12(3), a force of the spring 715 energizes clockwise the rocking lever 82 around the center of the center axis 81 through the engaging pin 821 and also energizes counterclockwise the segment gear 84 engaged with the pinion 83. Accordingly, a counterclockwise force (white arrow mark Fc) is applied to the control lever 7. Namely, direction of the energizing force of the spring 715 applied to the control lever is inverted at the boundary defined with the line where the centers of the engaging pin 471, center axis 81, and the engaging pin 821 are aligned.

As the rocking lever 82 turns clockwise (direction of arrow mark Ra) to rock and becomes apart from the position where the centers of the engaging pin 471, center axis 81, and engaging pin 821 are aligned on a line, length of the perpendicular line drooped from the center of the center axis 81 to the vector of the force (white arrow mark Fa) of the spring 715 working for the engaging pin 821 becomes longer gradually. Accordingly, a moment of the force working for the engaging pin 821 by the spring 715 to turn clockwise (direction of arrow mark Ra) the rocking lever 82 is gradually increased.

Therefore, a counterclockwise force (white arrow mark Fc) of the spring 715 working for the control lever 7 is gradually increased. As a result, since the force required to push the pusher rod 77 against the force of the spring 741 is gradually reduced, the force required by the pusher plate 73 to attract the control lever 7 toward the steering wheel 92 is also gradually reduced.

When the control lever 7 reaches the control lever end b in the unclamping side in FIG. 12(3), the projection 71 integrated with the driven lever 714 moves up to the right end, completing the unclamping operation of the tilt head clamp 4. Simultaneously, the pusher plate 73 integrated with the driven lever 714 pushes the pusher rod 77, completing the unclamping operation of the column clamp 21.

As a result, even when a driver takes a hand off the control lever 7, the control lever 7 maintains the stationary condition at the unclamping side control lever end b illustrated in FIG. 12(3) in order to maintain the unclamping condition of the tilt head clamp 4 and the column clamp 21. Accordingly, back-and-forth position and tilt angle of the steering wheel 92 can be adjusted easily under the condition that the steering wheel 92 is maintained with both hands.

Upon completion of adjustment of back-and-forth position and tilt angle of the steering wheel 92, a driver takes a hand off the steering wheel 92 and pushes with the same hand the control lever 7 apart from the steering wheel 92. Thereby, the tilt head clamp 41 and column clamp 21 are clamped in the inverse sequence of the operation described above and the condition is returned to that of FIG. 12(1).

When a driver takes a hand off the control lever 7, since the control lever 7 is energized clockwise with the spring 715, the control lever 7 maintains the stationary condition at the control lever end a in the clamping side of FIG. 12(1). This clamping condition is maintained even after the driver takes a hand off the control lever 7.

Control Lever Maintaining Mechanism:

A structure and operations of the control lever maintaining mechanism 89 will be described with reference to FIG. 12(1) to F12(3). A counterclockwise force (white arrow mark Fc) working for the control lever 7 with the force (white arrow mark Fa) of the spring 715 at the control lever end b in the unclamping side of FIG. 12(3) is preferably set equal to or a little larger than the force required to push the pusher rod 77 against the force of the spring 741 for column clamp 21.

Namely, when the energizing force of the spring 715 is increased, a larger force is required to push the control lever 7 to the clamping position a from the unclamping side control lever end b as much as the increment. Moreover, a larger force is also required to pull the control lever 7 to the unclamping side control lever end b from the end a in the clamping side.

In view of eliminating such event, the energizing force of the spring 715 is set equal to or a little larger than that required to push the pusher rod 77. On the other hand, it suggests that the control lever 7 can move easily in the unclamping side control lever end b. Therefore, the control lever 7 probably happens to be displaced with inertia, that is, with impact and vibration during the adjusting operation for adjusting back-and-forth position and tilt angle of the steering wheel 92.

In order to eliminate such trouble, the tilt head 4 is provided with a control lever maintaining mechanism 89 to maintain the control lever 7 to the unclamping side control lever end b. As illustrated in FIG. 12(1) to FIG. 12(3), the control lever maintaining mechanism 89 comprises a support pin 86, a plate spring 87 having the U-shape engaging projection 871 at the right side end thereof, and an engaging groove 882 in the unclamping side formed at an arcuate guide surface 881 of the control lever 7.

The support pin 86 is secured to the side surface of tilt head 4 and includes an almost cylindrical shaft having two parallel side surfaces. At the left side of the plate spring 87, a rectangular base 872 is integrally formed. To this base 872, an almost cylindrical hole having two parallel side surfaces is formed. The plate spring 87 is secured to the support pin 86 because the almost cylindrical hole of the base 872 is engaged tightly with the almost cylindrical shaft of the support pin 86.

The support pins 86, 87 are allocated within a window-shape cutaway hole 88 opened to the control lever 7. At the lower side of the cutaway hole 88, the arcuate guide surface 881 is formed and the lower surface of the engaging projection 871 at the right end of the plate spring 87 is in contact with this guide surface 881 with a downward force of the plate spring 87. The center of the arcuate guide surface 881 is located at the center of the lever center axis 72C of the control lever 7. Accordingly, even if the control lever 7 turns to rock to any position, the lower surface of the engaging projection 871 is always sliding in contact with the guide surface 881.

To the guide surface 881, an arcuate unclamping side engaging groove 882 is formed. When the control lever 7 reaches the control lever end b in the unclamping side illustrated in FIG. 12(3), the engaging projection 871 at the right end of the plate spring 87 is energized to the lower side with the plate spring 87 to enter the unclamping side engaging groove 882. With engagement of the engaging projection 871 and the unclamping side engaging groove 882, the control lever 7 is maintained at the unclamping side control lever end b.

Accordingly, a problem that the control lever 7 is likely displaced to the clamping side control lever end a from the unclamping side control lever end b with an impact generated by position adjustment of the steering wheel 92 can be eliminated.

Steering Wheel Adjustment:

Manipulations and operations of members required for adjustment of back-and-forth position and tilt angle of the steering wheel 92 will be described below.

Adjustment of Tilt Angle and Back-And-Forth Position (Length of Steering Column)

For the adjustment of tilt angle and back-and-forth position of the steering wheel 92, a driver takes off a hand the steering wheel 92 and pulls (direction of arrow mark Rb) the control lever 7 in the forward direction (toward the unclamping side control lever end b from the clamping side control lever end a) with the same hand. Accordingly, the control lever 7 turns clockwise to rock the driven lever 714 around the center of the lever center axis 72A as illustrated in FIG. 4.

When the driven lever 714 is rocked, the projection 71 moves to the right in FIG. 3 and a gear arm 44 rotates counterclockwise with the gravity thereof. With rotation of the gear arm 44, engagement between the tooth of segment gear 33 and the tooth of gear 442 of the gear arm 44 is lost, and the tilt head 4 is capable of adjusting the tilt angle. Moreover, the pusher plate 73 rocks up to the position indicated by a chain line to push the pusher rod 77 up to the position indicated by the dotted line in the right direction of FIG. 9, overcoming the force of the spring 741.

Movement toward the right of the pusher rod 77 causes rocking of the rocking arm 61 and therefore counterclockwise rotation of a column clamp shaft 6. When the column clamp shaft 6 rotates, this shaft, which has been in the condition that the longer-diameter portion thereof is almost horizontal as illustrated in FIG. 11, is inclined as illustrated in FIG. 10. Therefore, the first wedge 211 and the second wedge 212 which are closed each other as illustrated in FIG. 8 are separated, canceling the clamping condition of the moving column member 3.

The energizing direction inverting mechanism 8 changes the direction to energize the control lever 7 with the spring 715 to the counterclockwise direction (white arrow mark Fc) from clockwise direction (white arrow mark Fb) when the centers of the engaging pin 471, center axis 71, engaging pin 821 are aligned on a line (FIG. 12(2)) in the course of the unclamping operation of the tilt head clamp 41 and column clamp 21.

Accordingly, a force of the spring 715 is applied to the pusher plate 73 for column clamp 21 as the force to push the pusher rod 77 against the force of the spring 715 and thereby operating force of a driver required to pull the control lever 7 toward the steering wheel 92 can be reduced.

When the control lever 7 reaches the unclamping side control lever end b as illustrated in FIG. 12(3), the control lever 7 is surely maintained at the unclamping side control lever end b, because the engaging projection at the end of the plate spring 87 enters the unclamping side engaging groove 882. Therefore, a driver can easily adjust back-and-forth position and tilt angle of the steering wheel 92 by taking a hand off the control lever 7 and then gripping the steering wheel 92 with both hands.

Upon completion of adjustment of back-and-forth position and tilt angle of the steering wheel 92, a driver takes a hand off the steering wheel 92 and pushes the control lever 7 with the hand taken off. With clockwise rocking of the control lever 7, the engaging projection 871 at the end of the plate spring 87 is pushed out of the unclamping side engaging groove 882 and the lower surface of the engaging projection 871 slides along the guide surface 881.

In the energizing direction inverting mechanism 8, when the centers of the engaging pin 471, center axis 81, and engaging pin 821 are aligned (FIG. 12(2)) on a line in the course of the clamping operation of the tilt head clamp 41 and column clamp 21, the direction in which the control lever 7 is energized with the spring 715 is inverted to the clockwise direction (white arrow mark Fb) from the counterclockwise direction (white arrow mark Fc). Accordingly, the control lever 7 turns clockwise to rock with the force of the spring 715, reducing the force required to push the control lever 7.

Therefore, the control lever 7 causes the driven lever 714 to rock counterclockwise around the center of the lever center axis 72A with the force of the spring 715. As a result, the projection 71 moves to the left in FIG. 3, the teeth of segment gear 33 engage with the teeth of the gear 442, and the tilt head 4 is clamped with the column head 31. Simultaneously, the pusher plate 73 turns to rock up to the position indicated with a solid line and the pusher rod 77 returns to the position indicated with a solid line in the left direction in FIG. 9 with the force of the spring 741.

Movement toward the left of the pusher rod 77 generates rocking of the rocking arm 61 and thereby also generates clockwise rotation of the column clamp shaft 6. When the column clamp shaft 6 rotates, the column clamp shaft 6 which has been inclined in the longer-diameter portion thereof as illustrated in FIG. 10 turns to the condition where the longer-diameter portion becomes horizontal as illustrated in FIG. 11.

Accordingly, since the first wedge 211 and the second wedge 212 illustrated in FIG. 8 come close with each other, the moving column member 3 is clamped. Since the energizing direction inverting mechanism 8 maintains the clamping side control lever end a of the control lever 7 with the force of the spring 715 even when a driver takes a hand off the control lever 7, the clamping condition of the column clamp 21 and tilt head clamp 41 is maintained.

When the tilt head clamp 41 is unclamped, a downward force is generated as if a person were drooping with the head in accordance with the weight thereof. Therefore, an intensive spring 45 for counter-balance (FIG. 3, FIG. 4) is provided. Here, it is possible to cancel such downward force with this spring 45 or to impart, to the tilt head 4, the force to maintain the steering wheel 92 at the highest tilting position in order to make easier the driver's getting on and off.

As described above, according to this steering column, since the direction to energize the control lever 7 with the spring 715 is inverted with the energizing direction inverting mechanism 8 to the unclamping direction from the clamping direction in the course of the operation for unclamping the tilt head clamp 41 and column clamp 21 by operating the control lever 7 in the unclamping direction, it is no longer required to continuously apply a large force for operating the control lever 7 in the unclamping direction.

Moreover, even when a hand is taken off the control lever 7 during the unclamping of the telescopic mechanism and tilting mechanism, the control lever 7 is surely maintained at the unclamping side control lever end b with the control lever maintaining mechanism. Therefore, it is no longer required to continuously apply the force for maintaining above condition. In addition, since the control lever never happens to be displaced to the clamping side control lever end a from the unclamping side control lever end b with an impact generated when the steering wheel position is adjusted, the steering wheel position can be adjusted smoothly.

The mechanisms described above can naturally be adapted to the steering column which is provided with any of the tilt head clamp and the column clamp.

Second Embodiment

Figure 13:
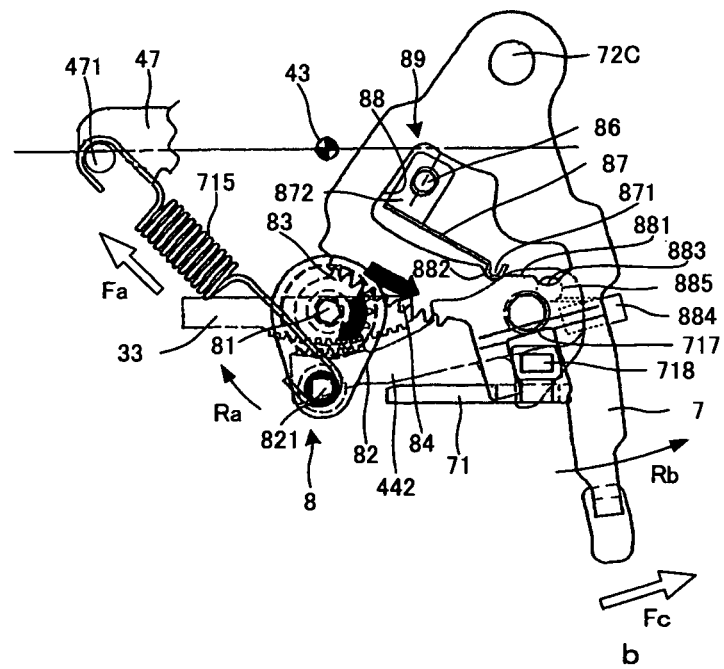
FIG. 13 is an operation explanation diagram illustrating the energizing direction inverting mechanism 8 and the control lever maintaining mechanism 89 of the present invention to show the other embodiment.

A modification example of the control lever maintaining mechanism 89 is illustrated in FIG. 13. In this example, a detecting means for issuing an alarm to a driver by detecting whether the control lever 7 is in the clamping side control lever end a or not. Moreover, a clamping side engaging groove 883 is also additionally provided to the clamping side control lever end a so that the control lever 7 cannot be rocked displacing toward the unclamping side control lever end b from the clamping side control lever end a.

The control lever maintaining mechanism 89 is structured so that the clamping side engaging groove 883 is formed to the guide surface 881 in the right side of the unclamping side engaging groove 882 and when the control lever 7 reaches the clamping side control lever end a, the engaging projection 871 in the right side of the plate spring 87 enters the clamping side engaging groove 883 by receiving the downward force of the plate spring 87. With engagement between the engaging projection 871 and the clamping side engaging groove 883, the control lever 7 is maintained at the clamping side control lever end a.

Moreover, the lower surface of the engaging projection 871 entering the clamping side engaging groove 883 is detected with a roller type contactor of a limit switch 884 fixed to the tilt head 4. Accordingly, when the control lever 7 is not set to the clamping side control lever end a, driver's attention can be awaken with lighting of a red alarm display lamp or the like. The plate spring 87 may be replaced with any type of spring as it can satisfy the requirement. For example, a torsional spring or ball plunger or the like can be used.

Third Embodiment

A third embodiment shows an example in which the control lever of a different structure is employed. Here, FIG. 14(1) is a front elevation diagram showing the condition that the control lever is set to the clamping side control lever end a, while FIG. 14(2) is a right side elevation diagram of FIG. 14(1). FIG. 13 is a front elevation diagram showing the condition that the control lever is set to the unclamping side control lever end b.

Figure 14:
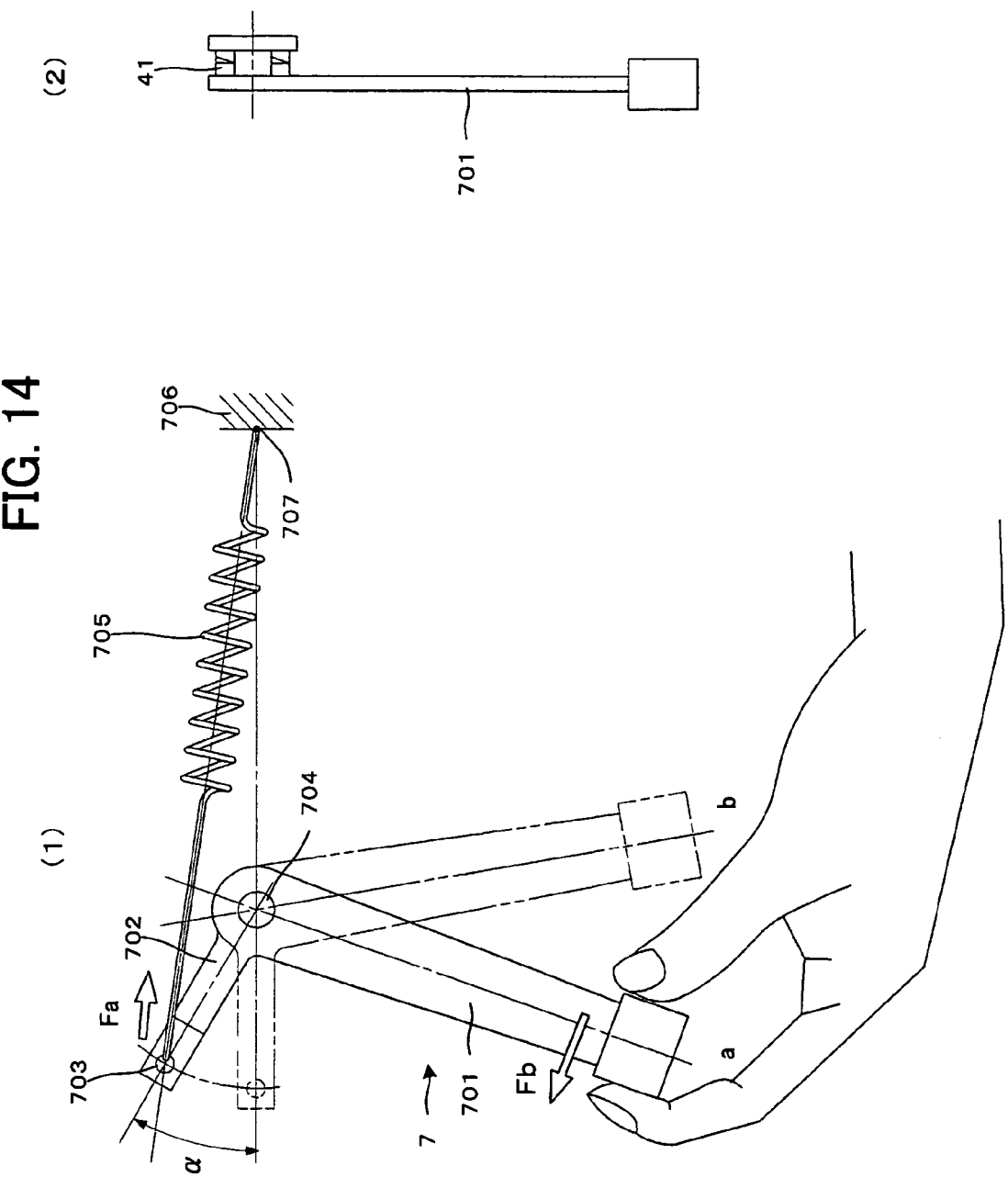
Figure 15:
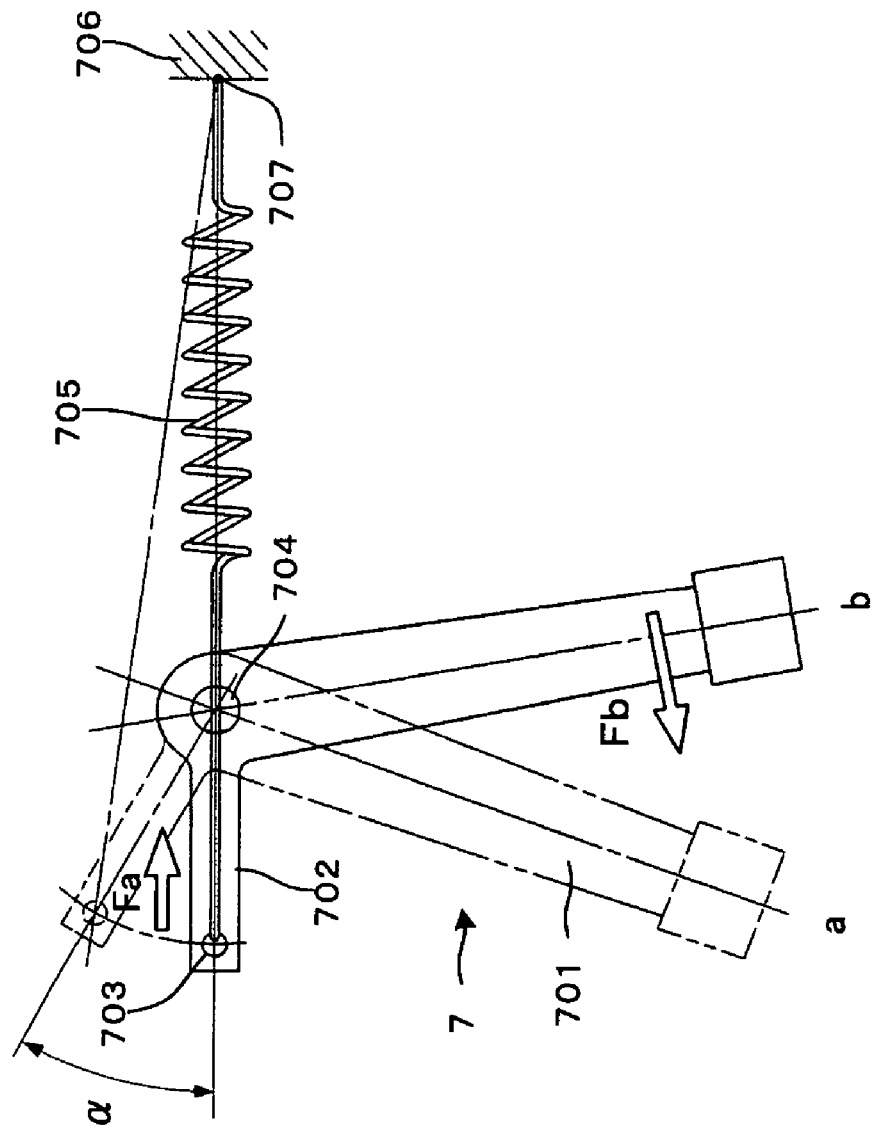
FIG. 15 is a front elevation diagram of the steering column of the third embodiment of the present invention to show the condition that the control lever is located at the unclamping side control lever end b.

In FIG. 14 and FIG. 15, the L-shape control lever 7 formed of an operating portion 701 and the spring engaging portion 702 is pivotally supported to rock with the lever center axis 704. The spring 705 is fixed in its right end at a fixing position 707 of the fixing portion 706, while engaged with an engaging hole 703 in its left side at the left end of the spring engaging portion 702.

As illustrated in FIG. 14(2), the control lever 7 is provided, around the lever center axis 704, with the tilt head clamp 41 which is formed, for example, of a cam mechanism which functions as a stopper at the clamping end and unclamping end. With the rocking of the control lever 7, the clamping/unclamping mechanism of the tilting mechanism can be manipulated. When the control lever 7 rocks to the clamping side control lever end (a) indicated with a solid line in FIG. 14(1), the clamping/unclamping mechanism of the tilting mechanism can be clamped with the cam mechanism of the tilt head clamp 41. When the control lever 7 rocks to the unclamping side control lever end (b) indicated with a chain line in FIG. 14(1), the clamping/unclamping mechanism of the tilting mechanism can be unclamped with the cam mechanism of the tilt head clam 41.

Figure 18:
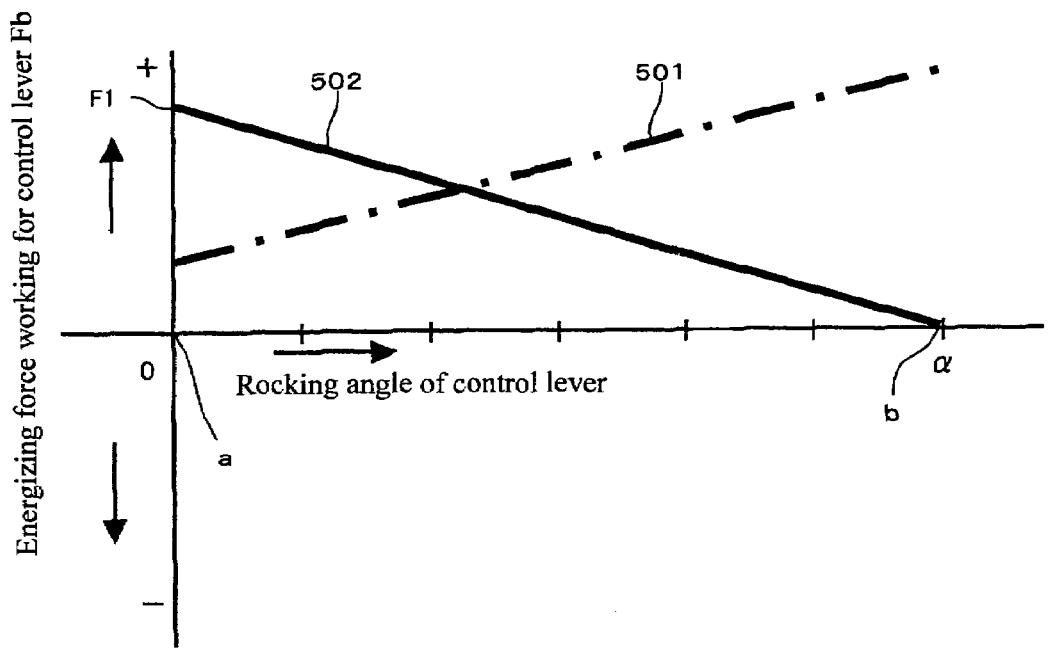
FIG. 18 is a graph illustrating the relationship between a rocking angle of the control lever and the force applied to the control lever in the steering column 1 of the third embodiment of the present invention.

FIG. 18 is a graph showing the relationship between a rocking angle of the control lever 7 and an energizing force applied to the control lever 7. The horizontal axis of FIG. 18 indicate a rocking angle of the control lever 7, while the vertical axis indicates amplitude of the energizing force applied to the control lever 7 from the spring 705. In FIG. 18, a chain line 501 indicates amplitude of the force applied to the control lever 7 by the conventional spring, while a solid line 502 indicates amplitude of the force applied to the control lever 7 by the spring 705. The conventional spring gradually increases the force to be applied to the control lever 7 as the control lever 7 is operated toward the unclamping side control lever end b. Therefore, operation of the control lever 7 has required a considerably large operating force.

At the clamping side control lever end a in FIG. 14(1) and FIG. 18, the force (white arrow mark Fa) of spring 705 energizes, through the engaging hole 703, the spring engaging portion 702 toward the rocking end in the clockwise direction around the center of the lever center axis 704, the operating portion 701 is always pushed clockwise (white arrow mark Fb) and the control lever 7 is energized clockwise to the rocking end.

At the clamping side control lever end a, since the length of the perpendicular line drooped to the vector of the force (white arrow mark Fa) of the spring working for the engaging hole 703 from the center of the lever center axis 704 becomes maximum, a moment of the force of the spring 705 to rock clockwise the operating portion 701 becomes maximum. Therefore, the force applied to the operating portion 701 also becomes maximum F1. In this timing, the clamping/unclamping mechanism of the tilting mechanism is clamped with the cam mechanism of the tilt head clamp 41 of the control lever 7.

When a driver maintains the control lever 7 with a hand and pulls toward the unclamping side control lever end b, the center of the engaging hole 703 comes close to the line connecting the fixing position 707 at the right end of the spring 705 and the lever center axis 704. Accordingly, the length of the perpendicular line drooped to the vector of the force (white arrow mark Fa) of the spring 705 working for the engaging hole 703 from the center of the lever center axis 704 gradually comes close to zero. Therefore, a moment of the force working for the engaging hole 703 caused by the spring 705 to rock clockwise the spring engaging portion 702 gradually comes close to zero.

Accordingly, as indicated with a solid line 502 of FIG. 18, the clockwise force (white arrow mark Fb) caused by the spring 705 working for the operating portion 701 gradually comes close to zero as it comes close to the position where the centers of the fixing position 707, lever center axis 704, and the engaging hole 703 are aligned on the line. As a result, the operating force required to attract the operating portion 701 toward the unclamping side control lever end b gradually comes close to zero against the force of the spring 705.

When the operating portion 701 rocks as much as the rocking angle α and reaches the unclamping side control lever end b as illustrated in FIG. 15, the clockwise force (white arrow mark Fb) of the spring 705 working for the operating portion 701 becomes almost zero and the operating portion 701 can be manipulated with a light operating force. In this case, the clamping/unclamping mechanism of the tilting mechanism is unclamped with the cam mechanism of the tilt head clamp 41 of the control lever 7. Moreover, when the operating portion 701 is rocked counterclockwise a little to the position of the unclamping side control lever end b passing over the unclamping side control lever end b of FIG. 15 (position where the centers of the fixing position 707, lever center axis 704 and engaging hole 703 are aligned on the line), the spring 705 energizes counterclockwise the operating portion 701. Accordingly, the tilt head clamp 41 can surely be maintained in the unclamping condition.

As a result, even when a hand takes off the control portion 701, the operating portion 701 is maintained to the condition that it stops at the unclamping side control lever end b illustrated in FIG. 15, maintaining the unclamping condition of the tilt head clamp 41. Therefore, the tilt angle of the steering wheel can be adjusted easily under the condition that the steering wheel is maintained with both hands.

When adjustment of the tilt angle of the steering wheel is completed, a driver takes a hand off the steering wheel and pushes the operating portion 701 toward the clamping side control lever end a with the hand which has taken off the steering wheel. Thereby, the center of engaging hole 703 isolates from the line connecting the fixing position 707 at the right end of the spring 705 and the lever center axis 704 and thereby the length of the perpendicular line drooped from the center of the lever center axis 704 to the vector of the force (white arrow mark Fa) of the spring working for the engaging hole 703 gradually becomes longer.

Accordingly, since a moment of the force working for the engaging hole 703 of the spring 705 to rock clockwise the spring engaging portion 702 gradually becomes larger, the clamp operation of the tilt head clamp 41 can be performed only when a driver gives a small force to the operating portion 701, resulting in the condition of FIG. 14(1).

When a driver takes a hand off the operating portion 701, the control lever 7, which is imparted the clockwise force of the spring 705, maintains the stationary condition at the clamping side control lever end a of FIG. 14 (1). This clamping condition is maintained even when the take takes off the operating portion 701.

Fourth Embodiment

Figure 16:
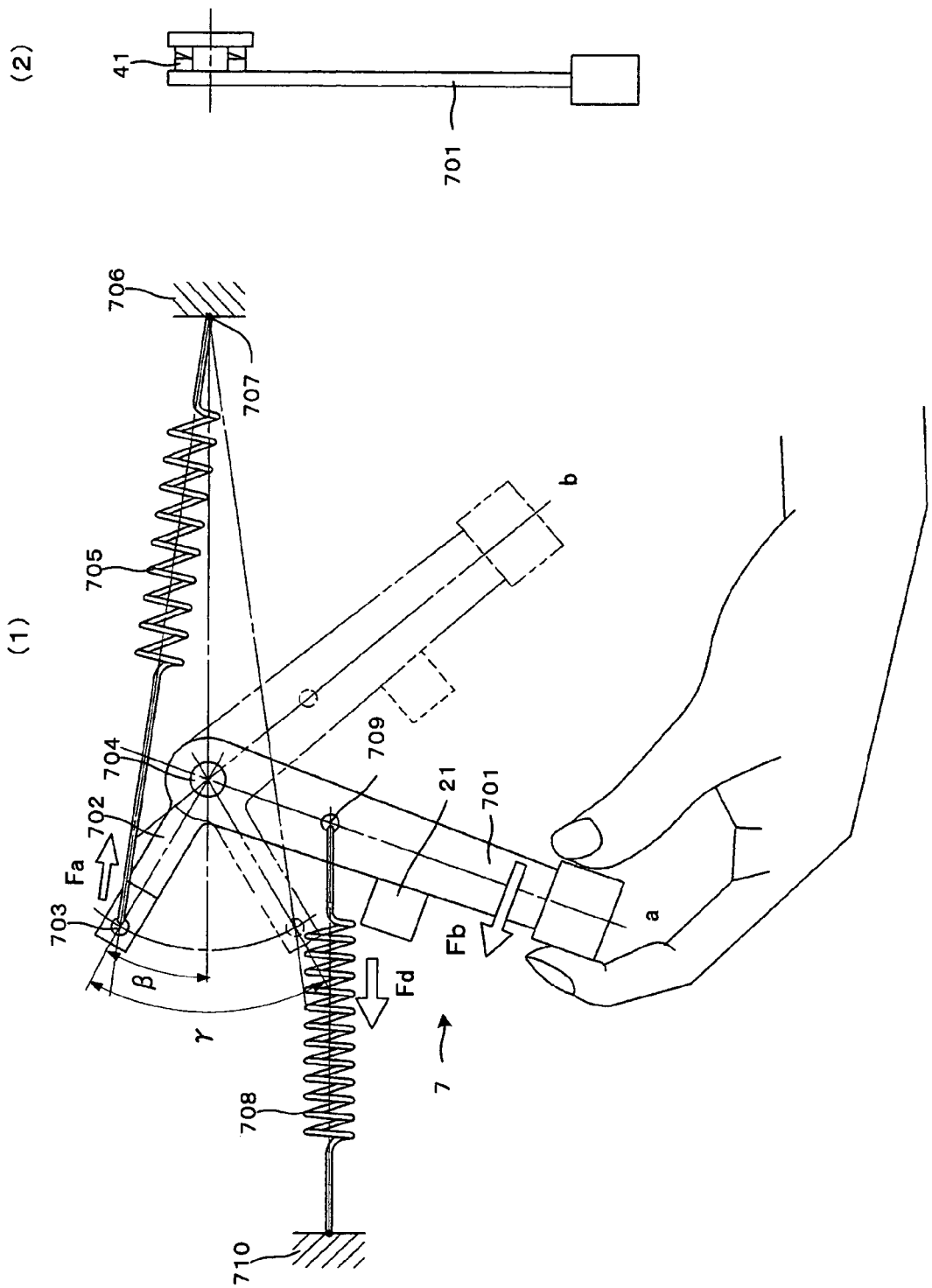
Figure 17:
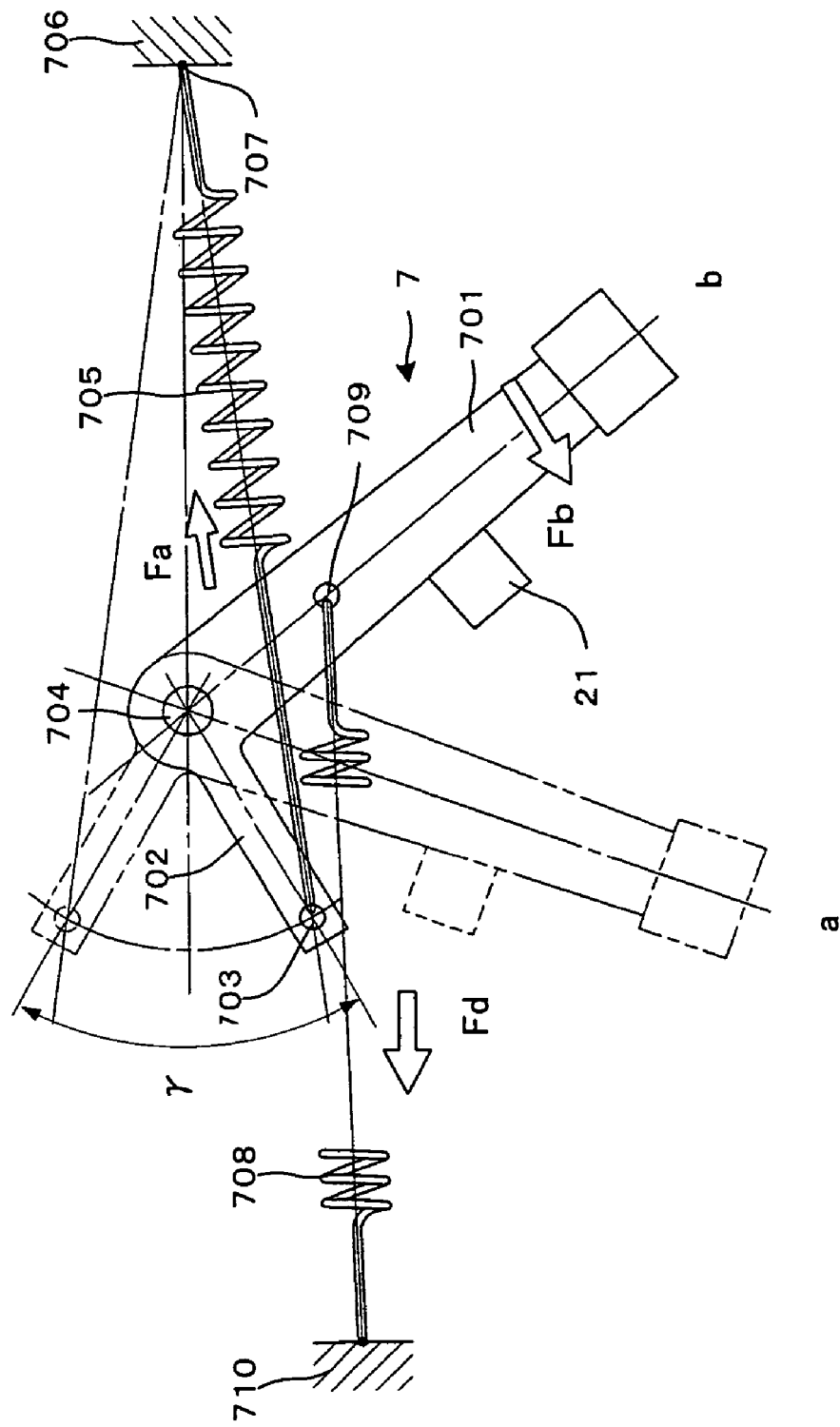
FIG. 17 is a front elevation diagram of the steering column of a fourth embodiment of the present invention to show the condition that the control lever is located at the unclamping side control lever end b.

A fourth embodiment describes an example having introduced a different structure of the control lever. Here, FIG. 16(1) is a front elevation diagram illustrating the condition that the control lever 7 is set to the clamping side control lever end a. FIG. 16(2) is a right side elevation diagram of FIG. 16(1). FIG. 17 is a front elevation diagram illustrating the condition that the control lever 7 is set to the unclamping side control lever end b.

In FIG. 16(1) and FIG. 17, the L-shape control lever 7 formed of the operating portion 701 and spring engaging portion 702 is pivotally supported to rock with the lever center axis 704. The one spring 705 is fixed at its right end to the fixing portion 706 in the fixing position 707 and is also engaged at its left end to the engaging hole 703 in the left end of the spring engaging portion 702. Moreover, the other spring 708 is fixed at its left end to the other fixing portion 710 and the right end of the spring 708 engages with the engaging hole 709 at the intermediate part of the operating portion 701.

As illustrated in FIG. 16(2), the control lever 7 is provided, around the lever center axis 704, with the tilt head clamp 41 formed, for example, of the cam mechanism which functions as a stopper of the clamp end and unclamp end. Therefore, the clamping/unclamping mechanism of the tilting mechanism can be operated with the rocking of the control lever 7. Moreover, the column clamp 21 formed of a wedge mechanism is provided to the intermediate portion of the operating portion 701 and thereby since the control lever 7 turns to rock, the clamping/unclamping mechanism of the telescopic mechanism can be operated.

When the control lever 7 rocks to the clamping side control lever end a indicated with a solid line in FIG. 16(1), the clamping/unclamping mechanisms of the tilting mechanism and telescopic mechanism can be clamped simultaneously with the cam mechanism of the tilt head clamp 41 and the wedge mechanism of the column clamp 21. When the control lever 7 rocks to the unclamping side control lever end b indicated with a chain line in FIG. 16(1), the clamping/unclamping mechanisms of the tilting mechanism and telescopic mechanism can be unclamped simultaneously with the cam mechanism of the tilting mechanism and the wedge mechanism of the column clamp 21.

Figure 19:
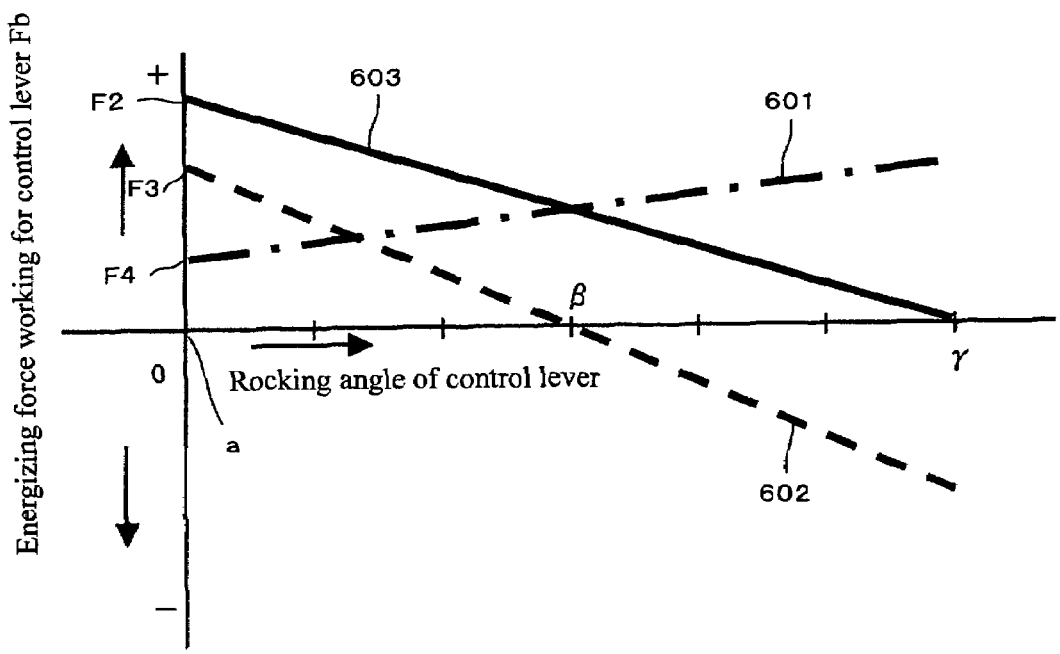
FIG. 19 is a graph illustrating the relationship between a rocking angle of the control lever and the force applied to the control lever in the steering column 1 of a fourth embodiment of the present invention.

FIG. 19 is a graph illustrating relationship between rocking angle of the control lever 7 and amplitude of the force working for the control lever 7. The horizontal axis of FIG. 19 indicates rocking angle of the control lever 7, while the vertical axis, amplitude of the force working for the control lever 7 with the springs 705, 708. A chain line 601 in FIG. 19 indicates amplitude of the force working for the control lever 7 with the spring 708, a broken line 601 indicates amplitude of the force working for the control lever 7 with the spring 705, and a solid line indicates amplitude of the force working for the control lever 7 with the combined force of the springs 708 and 705.

At the clamping side control lever end a of FIG. 16(1) and FIG. 19, the force (white arrow mark Fa) of the spring 705 energizes clockwise the spring engaging portion 702 around the center of the lever center axis 704 through the engaging hole 703. Moreover, the force (white arrow mark Fd) of the spring 708 energizes clockwise the operating portion 701 around the center of the lever center axis 704 through the engaging hole 709. Accordingly, the clockwise force (white arrow mark Fb) always energizes the operating portion 701 and the control lever 7 is energized clockwise to the rocking end.

At the clamping side control lever end a, the force (white arrow mark Fa) of the spring 705 increases the force to rock clockwise the operating portion 701 to the maximum value F3. Moreover, the force (white arrow mark Fd) of the spring 708 increases the force to rock clockwise the operating portion 701 to the minimum value F4.

As a result, the combined forces of the springs 705 and 708 provides the maximum energizing force F2 (F2=F3+F4). This maximum energizing force F2 is working as the force to rock clockwise the operating portion 701 at the clamping side control lever end a. In this case, the clamping/unclamping mechanisms of the tilting mechanism and telescopic mechanism are clamped with the cam mechanism of the tilt head clamp 41 of the control lever 7 and the wedge mechanism of the column clamp 21.

When a driver maintains the operating portion 701 with a hand and then pulls toward the unclamping side control lever end b, the center of the engaging hole 703 comes close to the line connecting the fixing position 707 at the right end of the spring 705 and the lever center axis 704. Accordingly, the length of the perpendicular line drooped to the vector of the force (white arrow mark Fa) of the spring 705 working for the engaging hole 703 from the center of the lever center axis 704 gradually comes close to zero. Therefore, a moment of the force working for the engaging hole 703 with the spring 705 to rock clockwise the spring engaging portion 702 gradually comes close to zero. When the operating portion 701 rocks only for the rocking angle β, the center of the engaging hole 703 reaches the line connecting the fixing position 707 at the right end of the spring 705 and the lever center axis 704 and the moment of the force working for the engaging hole 703 with the spring 705 becomes zero.

Thereafter, when the operating portion 701 is pulled toward the unclamping side control lever end b, the center of the engaging force 703 moves downward taking off the line connecting the fixing position 707 at the right end of the spring 705 and the lever center axis 704. Thereby, the force to rock the spring engaging portion 702 is inverted to the counterclockwise direction from the clockwise direction. Accordingly, since the length of the perpendicular line drooped to the vector of the force (white arrow mark Fa) of the spring 705 working for the engaging hole 703 from the center of the lever center axis 704 gradually becomes longer, a moment of the force to rock counterclockwise the spring engaging portion 702 with the spring 705 gradually becomes longer.

Force of the other spring 708 gradually increases in amplitude as indicated by a chain line 601 of FIG. 19 but direction of the force working for the operating portion 701 is still constant. As a result, as the operating portion 701 comes close to the unclamping side control lever end b, the clockwise force (white arrow mark Fb) combined with the springs 705 and 708 working for the operating portion 701 gradually comes close to zero as indicated by a solid line 603 of FIG. 19. Accordingly, the operating force required to pull the operating portion 701 toward the unclamping side control lever end b gradually becomes close to zero against the force of the springs 705 and 708.

When the operating portion 701 rocks only for the rocking angle γ and reaching the unclamping side control lever end b as indicated in FIG. 17, the clockwise force (white arrow mark Fb) combined with the springs 705, 708 working for the operating portion 701 becomes almost zero and thereby the operating portion 701 can be manipulated with a light force. In this case, the clamping/unclamping mechanisms of the tilting mechanism and telescopic mechanism are unclamped with the cam mechanism of the tilt head clamp 41 of the control lever 7 and the wedge mechanism of the column clamp 21.

As a result, even when a driver takes a hand off the operating portion 701, the operating portion 701 is maintained in the condition that it stops at the unclamping side control lever end b illustrated in FIG. 17, maintaining the unclamping condition of the tilt head clamp 41 and column clamp 21. Therefore, the tilt angle and back-and-forth of the steering wheel can be adjusted easily while the steering wheel can be maintained with both hands.

Upon completion of adjustment of tilt angle of the steering wheel, a driver takes a hand off the steering wheel and pushes with the same hand the operating portion 701 to the clamping side control lever end a. Accordingly, since the force combined with the springs 705 and 708 to rock clockwise the operating portion 701 gradually becomes larger, the tilt head clamp 41 and column clamp 21 can be clamped only by adding small force to the operating portion 701 and return to the condition of FIG. 16(1).

When a driver takes a hand off the operating portion 701, since the control lever 7 is imparted the clockwise force combined with the springs 705 and 708, the control lever 7 maintains the stationary condition at the clamping side control lever end a of FIG. 16(1). This clamping condition is maintained even when a driver takes a hand off the operating portion 701. In above two embodiments, the force working for the operating portion 701 with the spring 705 and combination of the springs 705 and 708 at the unclamping side control lever end b is reduced to almost zero but this force many also be set to the range of about ±10N. Moreover, the spring force characteristics 601, 602 illustrated in FIG. 19 are never limited to those shown in the figure. Namely, any characteristic may be useful when the combined force 603 is gradually reduced as the operating portion 701 comes close to the unclamping side control lever end b and the combined force becomes almost zero when the operating portion comes to the unclamping side control lever end b. In addition, the energizing force characteristics 502, 603 are not limited to the linear characteristics and may be the non-linear energizing force characteristics.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A steering column, comprising:
   a clamping/unclamping mechanism for clamping/unclamping a telescopic mechanism for adjusting back-and-forth position of a steering wheel or tilting mechanism for adjusting tilt angle of the steering wheel;
   a control lever swingable around an axis for controlling the clamping/unclamping mechanism; and
   an energizing member disposed in a plane perpendicular to the axis for energizing the control lever toward a stroke end for clamping,
   wherein force applied to the control lever by the energizing member is reduced as the control lever is moved from the stroke end for clamping to another stroke end for unclamping.

2. A steering column according to claim 1, wherein force applied to the control lever by the energizing member is substantial zero at the stroke end for unclamping.

3. A steering column according to claim 1, wherein the energizing member is a spring.

4. A steering column according to claim 1, wherein a plurality of energizing members are provided.

5. A steering column according to claim 4, wherein energizing direction of one among the energizing members is inverted halfway through operation of the control lever from the stroke end for clamping toward the stroke end for unclamping.

6. A steering column according to claim 1, further comprising a control lever maintaining mechanism for maintaining the control lever at the stroke end for the unclamping side control lever end thereof.

7. A steering column, comprising:
   a telescopic mechanism for adjusting back-and-forth position of a steering wheel;
   a tilting mechanism for adjusting tilt angle of the steering wheel;
   a clamping/unclamping mechanism for clamping/unclamping the telescopic mechanism;
   a clamping/unclamping mechanism for clamping/unclamping the tilting mechanism;
   a single control lever swingable around an axis for controlling clamping/unclamping conditions of both of the clamping/unclamping mechanisms; and
   an energizing member disposed in a plane perpendicular to the axis for energizing the control lever to a stroke end for clamping,
   wherein force applied to the control lever by the energizing member is reduced as the control lever is moved from the stroke end for clamping to another stroke end for unclamping.

8. A steering column according to claim 7, wherein force applied to the control lever by the energizing member is substantial zero at the stroke end for unclamping.

9. A steering column, comprising:
   a telescopic mechanism for adjusting back-and-forth position of a steering wheel;
   a tilting mechanism for adjusting tilt angle of the steering wheel;
   a clamping/unclamping mechanism for clamping/unclamping the telescopic mechanism;
   a clamping/unclamping mechanism for clamping/unclamping the tilting mechanism;
   a single control lever for controlling clamping/unclamping conditions of both of the clamping/unclamping mechanisms;
   a first energizing member for energizing the control lever toward a stroke end for clamping of the telescopic mechanism;
   a second energizing member for energizing the control lever toward a stroke end for clamping of the tilting mechanism,
      wherein direction of a resultant force applied to the control lever by the first and the second energizing members is inverted halfway through operation of the control lever from the stroke end for clamping toward another stroke end for unclamping.

* * * * *